(12) United States Patent
Webster et al.

(10) Patent No.: US 8,520,083 B2
(45) Date of Patent: Aug. 27, 2013

(54) METHOD OF REMOVING AN ARTEFACT FROM AN IMAGE

(75) Inventors: Steven David Webster, Scotland Island (AU); Andrew James Dorrell, East Blaxland (AU); Axel Lakus-Becker, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 12/732,725

(22) Filed: Mar. 26, 2010

(65) Prior Publication Data

US 2010/0245602 A1   Sep. 30, 2010

(30) Foreign Application Priority Data

Mar. 27, 2009   (AU) .................................. 2009201207
Dec. 22, 2009   (AU) .................................. 2009251084

(51) Int. Cl.
*H04N 5/228*   (2006.01)

(52) U.S. Cl.
USPC .................... 348/208.4; 348/241; 348/208.99

(58) Field of Classification Search
None
See application file for complete search history.

(56) References Cited

U.S. PATENT DOCUMENTS 3,512,464 A    5/1970   Cochran et al.

FOREIGN PATENT DOCUMENTS

WO    2007/129766 A1    11/2007

OTHER PUBLICATIONS

A. Levin, et al., "Motion-Invariant Photography", In Proceedings SIGGRAPH 2008, Aug. 2008; ACM: May 2008, 9 pgs.

*Primary Examiner* — Chieh M Fan
*Assistant Examiner* — Angel L Garces-Rivera
(74) *Attorney, Agent, or Firm* — Fitzpatrick, Cella, Harper & Scinto

(57) ABSTRACT

A method of removing an artefact from an image captured with a motion invariant camera is disclosed. The captured image is de-blurred using a spatially invariant blur kernel. An edge filter with a fixed offset is applied to the de-blurred image to identify the location of at least one artefact. A parameter is estimated based on a region either side of the identified location. The at least one artefact is removed from the de-blurred image using the parameter.

11 Claims, 20 Drawing Sheets

METHOD OF REMOVING AN ARTEFACT FROM AN IMAGE

CROSS-REFERENCE TO RELATED PATENT APPLICATIONS

This application claims the right of priority under 35 U.S.C. §119 based on Australian Patent Application No. 2009201207, filed on 27 Mar. 2009 and Australian Patent Application No. 2009251084, filed on 22 Dec. 2009, which are incorporated by reference herein in their entirety as if fully set forth herein.

TECHNICAL FIELD OF INVENTION

The present invention relates to capturing and processing image data and, in particular to a method of removing an artefact from a de-blurred image captured with a motion invariant camera. The present invention also relates to an apparatus and to a computer program product including a computer readable medium having recorded thereon a computer program for removing an artefact from a de-blurred image captured with a motion invariant camera.

BACKGROUND

Cameras are designed to capture detailed spatial information from static scenes. However, problems arise if a camera or objects in a scene move during an exposure period. These problems are due to the nature of a sensor which integrates light received over a period of time to obtain an estimate of light intensity at each sensor element of the camera. The measured light intensity is used to generate an image of the scene. The period of time during which the sensor is exposed to incoming light is referred to as an exposure period or exposure time. Motion causes portions of the scene image or the entire scene image to move across the sensor, smearing the collected light across multiple sensor pixels. This smearing is commonly described by the term "motion blur".

Whilst motion blur in a captured image can be used for artistic effect, it is generally viewed as a serious defect and resulting images are often discarded. To avoid blur, camera manufactures may incorporate hardware image stabilisation devices in a lens or at a sensor of a camera. However, hardware image stabilisation devices are only effective to counteract camera shake, and object motion in the scene still results in blur. Using a shorter exposure time reduces amount of blur but corresponding reduction in the amount of light captured can result in decreased image quality due to consequent increase in noise.

Post capture methods have been devised to reverse the blur-related smearing and create a de-blurred image. Such methods assume that the same blurred image can be obtained in two ways; firstly, through the use of a camera, and secondly by applying a blurring filter to an ideal snapshot image. The blurring is commonly modelled to be a linear, position-invariant process. Such a model allows the blurred image to be represented as a convolution with a blur kernel and some additive noise introduced by the capture process. Using the symbol * to express convolution and psf for a blurring filter kernel, also termed a point spread function (PSF), the blurred image, $image_{blurred}$, may be written in accordance with Equation (1) as follows:—

$$image_{blurred} = psf * image_{snapshot} + noise \quad (1)$$

In general terms, the point spread function describes how the light intensity of a point source at each location in the image is spread across neighbouring sensor pixels. A desired snapshot of the scene image may be obtained by inverting the action of the blurring operation. Direct inversion results in amplification of the noise, the severity of which depends on the nature of the point spread function and regularisation techniques are commonly employed to reduce this amplification. Typically, an instant of time chosen for the snapshot is the start, end or middle of the exposure period.

Two situations may occur in practical usage of a camera. Firstly, if the camera is not physically stabilised, camera shake results in blurring of a captured scene. In this case, an ideal image is an image of the scene as if the camera had not undergone any shaking. The second situation is where there is no camera shake but there are one or more objects moving in the scene. In this second situation, the ideal image is generally an image of the static scene with moving objects frozen in space, as if the objects were not moving.

Methods for removing blur in an image require an estimate of the point spread function. It is important that the estimate of the point spread function is accurate as errors can lead to serious artefacts, which can often be more objectionable to a viewer than original motion blur. Artefacts are easily introduced as the point spread function may be many pixels wide, and de-blurring will result in light from more distant pixels being added to local pixel values, leading to ghosting, if inaccuracies occur.

In a camera, it is usual for a sensor to be in a fixed position relative to a body of the camera. An image of a scene is captured by focusing light received by the camera from the scene onto the sensor for a finite exposure period. For a scene containing moving objects, the image captured by a fixed camera sensor will have regions of differing amounts of blur. The point spread function for the image varies for each moving object and depends on the object speed, direction and depth within the scene. This means that de-blurring methods need to segment the image of the scene and estimate the point spread function for each moving object separately. Segmenting the scene by identifying moving objects has been found to be a difficult problem. One issue is that the combination of a fixed exposure period and object motion with linear velocity results in a blur which overlaps a position of the object which is to be recovered in the image. Additionally, spatial frequency response of the corresponding blur point spread function is a "sinc" function which contains zeros. These zeros represent a complete loss of information concerning the image at the corresponding frequencies.

An alternative method of image capture has been proposed which attempts to avoid the need to segment the image according to objects of differing speeds. This alternative method has been termed "motion invariant imaging" and is applicable to scenes where objects have the same motion orientation. That is, objects that are moving on paths substantially parallel to each other in the image plane of a captured image. The method deliberately blurs captured sensor data by translating the image across the sensor of a camera used to capture the image during exposure time. In this instance, a single blur point spread function is used for de-blurring the captured image. A standard camera design which has been modified to achieve such a deliberate blur is referred to as a "motion invariant" camera. Ideally, in the motion invariant method, the point spread function is spatially invariant and is of a known form, containing only one parameter, the constant of acceleration, which is also known. The position of moving objects in the image does not correspond to one instant in time, but varies depending on object speed.

SUMMARY

It is an object of the present invention to substantially overcome, or at least ameliorate, one or more disadvantages of existing arrangements or to offer a useful alternative.

A method is described for processing data captured from a motion invariant camera to generate a "snapshot" image of a scene. The data is captured for the purpose of improving quality of results of a de-blurring operation performed on the image. The method identifies and analyses specific artefacts in a de-blurred version of the snapshot image. These artefacts are the result of discontinuities in a point spread function for moving objects within the image, resulting from a finite exposure period. The de-blurred snapshot image is generated by using the point spread function corresponding to a stationary object. The quality of the de-blurred snapshot image may be improved by removing the identified artefacts. Further, the results of the artefact analysis performed may be used to segment the scene into objects with an associated speed.

According to one aspect of the present disclosure, there is provided a method of removing an artefact from an image captured with a motion invariant camera, said method comprising the steps of:

de-blurring the captured image using a spatially invariant blur kernel;

applying an edge filter with a fixed offset to said de-blurred image to identify the location of at least one artefact;

estimating a parameter based on a region either side of said identified location; and removing said at least one artefact from said de-blurred image using said parameter.

According to another aspect of the present disclosure, there is provided a system for removing an artefact from an image captured with a motion invariant camera, said system comprising:

a memory for storing data and a computer program;

a processor coupled to said memory for executing said computer program, said computer program comprising instructions for:

de-blurring the captured image using a spatially invariant blur kernel;

applying an edge filter with a fixed offset to said de-blurred image to identify the location of at least one artefact;

estimating a parameter based on a region either side of said identified location; and removing said at least one artefact from said de-blurred image using said parameter.

According to still another aspect of the present disclosure, there is provided an apparatus for removing an artefact from an image captured with a motion invariant camera, said apparatus comprising:

means for de-blurring the captured image using a spatially invariant blur kernel;

means for applying an edge filter with a fixed offset to said de-blurred image to identify the location of at least one artefact;

means for estimating a parameter based on a region either side of said identified location; and means for removing said at least one artefact from said de-blurred image using said parameter.

According to still another aspect of the present disclosure, there is provided a computer readable medium comprising a computer program stored thereon for removing an artefact from an image captured with a motion invariant camera, said program comprising:

code for de-blurring the captured image using a spatially invariant blur kernel;

code for applying an edge filter with a fixed offset to said de-blurred image to identify the location of at least one artefact;

code for estimating a parameter based on a region either side of said identified location; and code for removing said at least one artefact from said de-blurred image using said parameter.

According to still another aspect of the present disclosure, there is provided a method of forming an image using an image sensor. The described method of forming an image comprises modifying the image capture process in a camera or any other image capture device, for the purpose of improving the quality of results of a subsequent de-blurring operation. The image forming method generally involves modulating the response of various elements of the image capture system over the exposure period, resulting in a temporal modulation function being applied to the capture system. Since the modulation function generally relates to the intensity of an image fading in an out, the temporal modulation function is also referred to as an "attenuation function". With such an image forming method, the point spread function (PSF) for objects in the scene is similar where the objects have similar motion orientation regardless of the speed of each object. This permits the use of a single PSF for de-blurring, thus reducing the usual complications associated with segmenting the image into areas which contain objects with different speeds.

The method of forming an image using an image sensor comprises the step of providing an image shift trajectory and image shift acceleration function. The method also comprises providing an image intensity attenuation function that results in the formed image having a gradual fade in and fade out over the exposure period. According to the method, the image, which is translated across the sensor in accordance the image shift trajectory and the image shift acceleration function, is captured within an exposure period. The final image is formed on the basis of the captured image being modified by the intensity attenuation function.

According to still another aspect of the present disclosure, there is provided an image forming system comprising a sensor for capturing the image, shifting means for shifting the image with respect to the sensor along an image shift trajectory, image attenuation means for modulating the image captured by the sensor and one or more processors. The one or more processors are used for determining each of the image shift trajectory, the image shift acceleration function and the image attenuation function. In addition the one or more processors are used for controlling the shifting means so as to, during an exposure period, capture the image by exposing the sensor to the image while shifting the image relative to the sensor. The relative shift of the image is effected along the image shift trajectory and according to the image shift acceleration function. The one or more processors are also used for controlling the image attenuation means so as to form the image by modulating the image captured by the sensor according to the image attenuation function.

According to still another aspect of the present disclosure, there is provided a computer readable storage medium having a computer program recorded thereon, the program being executable by a computer module to make the computer module form an image of an object by capturing it on a sensor, the program comprising:

code for determining each of (i) an image shift trajectory, (ii) an image shift acceleration function and (iii) an image attenuation function;

code for capturing the image while, during an exposure period, shifting the image relative to the sensor the relative shift of the image being effected along the image shift trajectory and according to the image shift acceleration function, and code for modifying the captured image according to the image attenuation function to form the image.

Other aspects are also disclosed.

BRIEF DESCRIPTION OF THE DRAWINGS

Some aspects of the prior art and at least one embodiment of the disclosed method will now be described with reference to the following drawings, in which.

DETAILED DESCRIPTION INCLUDING BEST MODE

It is to be noted that the discussions contained in the "Background" section and that above referring to prior art arrangements, relate to discussions of documents or devices which may form public knowledge through their respective publication and/or use. Such should not be interpreted as a representation by the present inventor(s) or the patent applicant that such documents or devices in any way form part of the common general knowledge in the art.

In motion invariant imaging, it is desired to use a single, spatially invariant point spread function to de-blur an image containing objects moving at different speeds. In practice, the finite exposure period of a camera acquiring the image means that the point spread function is not precisely spatially invariant. In particular, the finite exposure time for capturing the image results in variations in the point spread function, depending on object speed. Such variations are manifested as discontinuities in the tail of the point spread function. Since the location of such discontinuities varies with object speed, artefacts occur if only the single point spread function is used for de-blurring the image. However, the point spread function may be decomposed into a linear combination of two components, including an invariant component, $psf_{invariant}$, and a component, $psf(s)_{variant}$, which depends on object location and speed, in accordance with Equation (2), as follows:

$$image_{blurred} = (psf_{invariant} + psf(s)_{variant}) * image_{snapshot} \quad (2)$$

The two components $psf_{invariant}$, and $psf(s)_{variant}$ are described in detail in the following description.

Figure 1A:
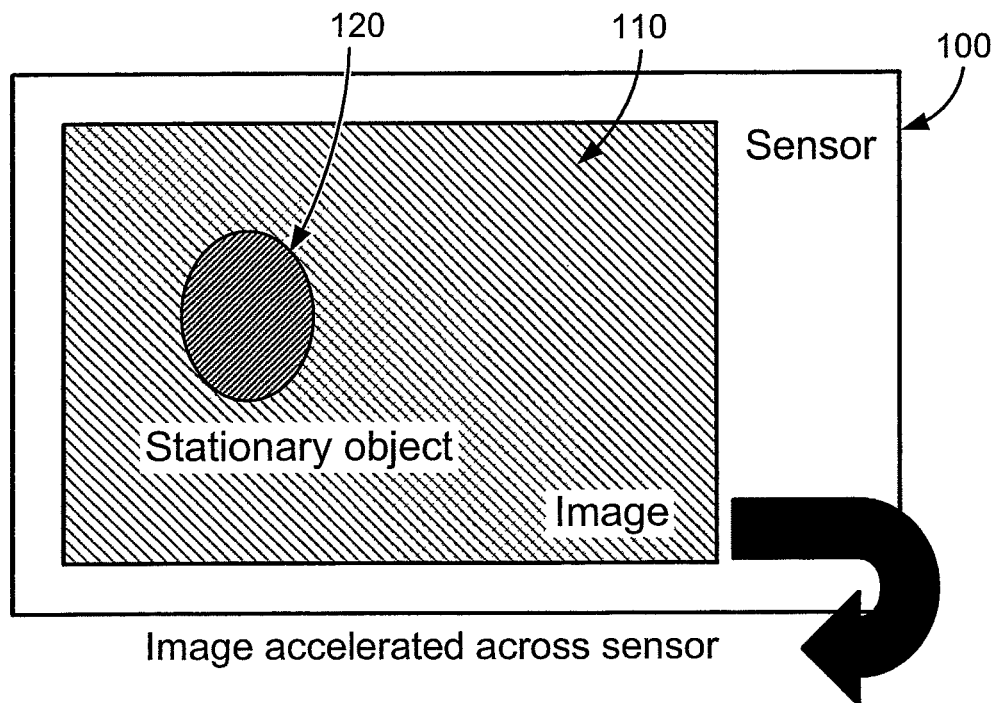
FIG. 1A shows a sensor and an image containing a stationary object, where the image is accelerated across the sensor.

FIG. 1A shows a sensor 100 and an image 110 of a scene containing a stationary object 120. During exposure, the image 110 is translated across the sensor 100. The translation is such that, at the start of the exposure, the image 110 moves quickly in one direction, slows to a stop, reverses direction and increases speed to the initial value. The speed of translation may be measured in units of pixels/second and this convention is used in the description below.

Figure 1B:
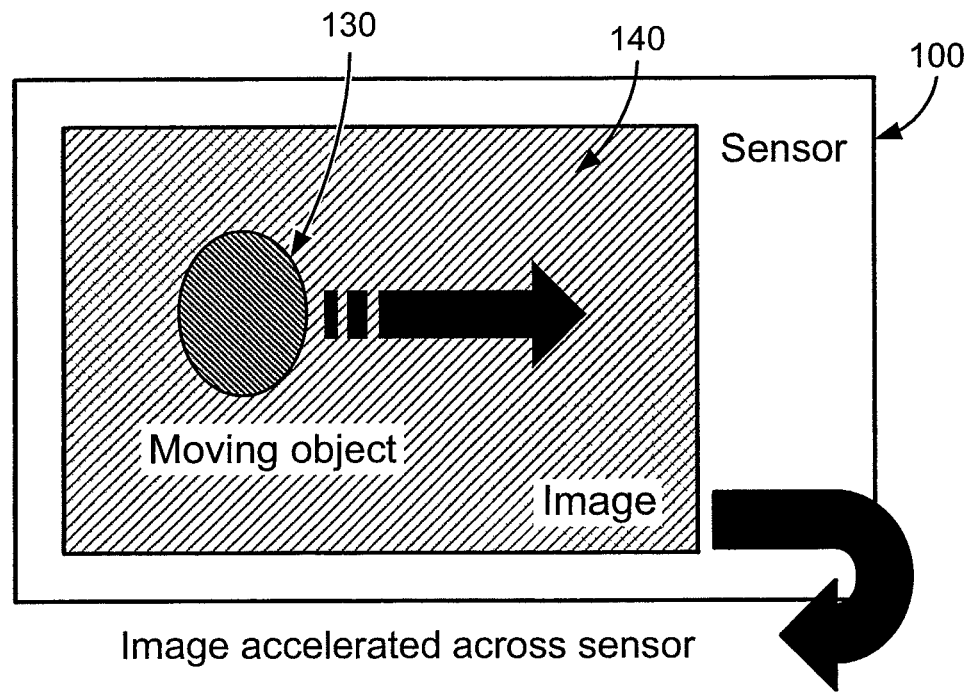
FIG. 1B shows the sensor of FIG. 1 with an image containing a moving object, where the image is accelerated across the sensor.

FIG. 1B similarly shows another image 140 of a scene focussed on the sensor 100. The image 140 includes an object 130 moving at a constant speed within the scene (and the image 140). During exposure, the image 140 is accelerated across the sensor 100 on the same trajectory as the moving object 130. In particular, the image 140 starts from an initial speed. The image 140 is then slowed to zero and then reversed to the initial speed, but in the opposite direction. At the end of the exposure period the image 140 is back at the same location as at the start of the exposure period.

Figure 2A:
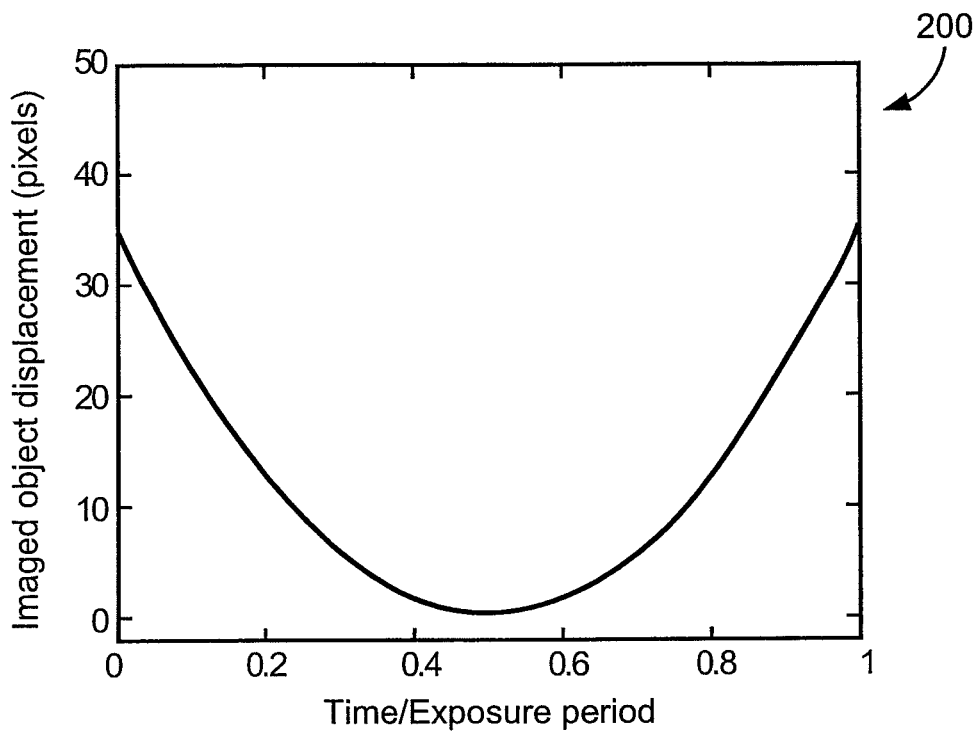
FIG. 2A shows a graph of the displacement across the sensor of FIG. 1 for the object of FIG. 1A.

FIG. 2A shows a graph 200 of displacement across the sensor 100 for the image 110 containing the object 120 that is stationary, where the image 110 is translated according to a constant acceleration value.

Figure 2B:
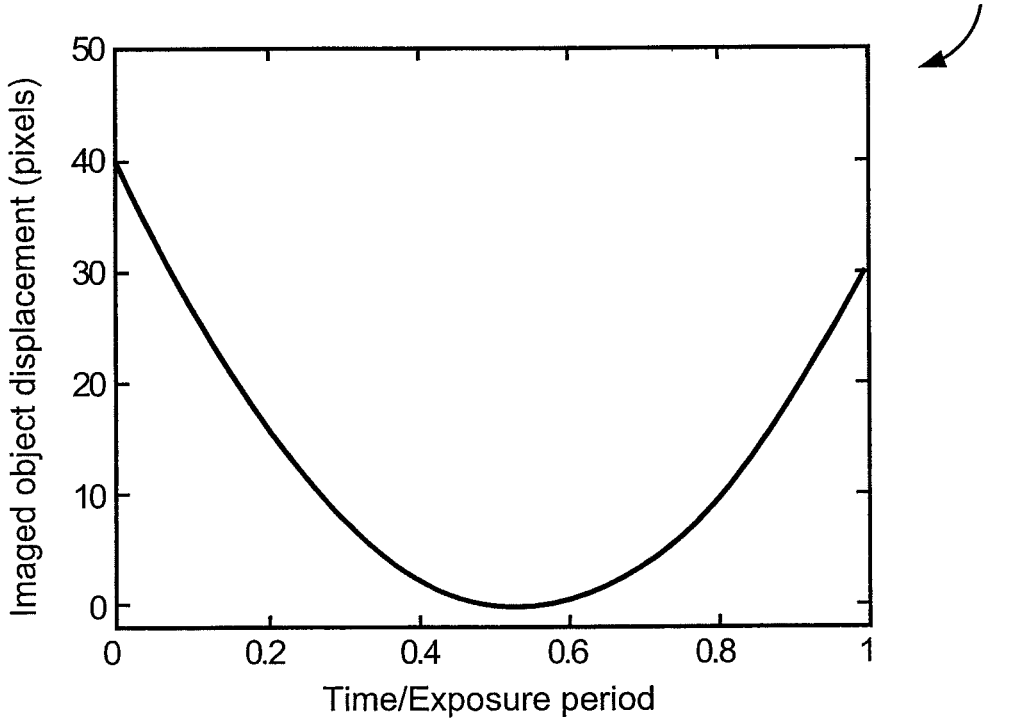
FIG. 2B shows a graph of the displacement, across the sensor, for the object of FIG. 1B.

FIG. 2B shows a graph 201 of displacement across the sensor 100 for the object 130 moving at a constant speed within the image 140. The image 140 is again accelerated across the sensor 100 during the exposure period.

The nature of the point spread function which corresponds to the images 110 and 140, will now be described in more detail. A one dimensional point spread function for the image 110 of a stationary point light source (i.e., object 120) which is accelerated across the sensor 100 at a constant rate a, as illustrated by FIG. 1A, for finite time interval $-T$, $T$, with initial speed $-2aT$, is represented by Equation (3) as follows:

$$PSF(x) = \begin{cases} \frac{1}{\sqrt{ax}}; & x \Leftarrow aT^2 \\ 0; & x > aT^2 \end{cases} \qquad (3)$$

where x represents displacement in the direction of acceleration.

A corresponding point spread function for a point light source (i.e., object 130) moving at a constant speed s, as shown by FIG. 1B, where the point light source is also accelerated across the sensor 100 at constant rate a is given by Equation (4) as follows:

$$PSF(x) = \begin{cases} \dfrac{1}{\sqrt{a\left(x+\frac{s^2}{4a}\right)}}; & 0 \Leftarrow x+\frac{s^2}{4a} \Leftarrow a\left(T-\frac{s}{2a}\right)^2 \\ \dfrac{1}{2\sqrt{a\left(x+\frac{s^2}{4a}\right)}}; & a\left(T-\frac{s}{2a}\right)^2 \Leftarrow x+\frac{s^2}{4a} \Leftarrow a\left(T+\frac{s}{2a}\right)^2 \\ 0; & x+\frac{s^2}{4a} > a\left(T+\frac{s}{2a}\right)^2 \end{cases} \qquad (4)$$

In order to have a common origin, the substitution $$u = x + \frac{s^2}{4a}$$

may be used in Equation (4), and the corresponding point spread function is given by Equation (5) as follows:

$$PSF(u) = \begin{cases} \dfrac{1}{\sqrt{au}}; & 0 \Leftarrow u \Leftarrow a\left(T-\frac{s}{2a}\right)^2 \\ \dfrac{1}{2\sqrt{au}}; & a\left(T-\frac{s}{2a}\right)^2 \Leftarrow u \Leftarrow a\left(T-\frac{s}{2a}\right)^2 \\ 0; & u > a\left(T+\frac{s}{2a}\right)^2 \end{cases} \qquad (5)$$

The captured image (e.g., 110) uses spatial coordinate x, and a de-blurred snapshot image uses spatial coordinate u.

The displacement d of a point light source moving at a constant speed, s, is given by Equation (6) as follows:

$$d = at^2 - st \qquad (6)$$

where the displacement d is determined over exposure time $[-T, T]$, and during the exposure time, will vary over a range of $$\left[-\frac{s^2}{4a}, aT^2 + sT\right].$$

The relationship of Equation (6) may be used to determine an appropriate value for a when the displacement range is fixed, the exposure time, 2T, is known and a maximum value for speed, s, has been chosen.

From the point spread function of Equation (5), the range over which the point spread function has half (½) value is a region of discontinuity as follows:

$$\left[a\left(T-\frac{s}{2a}\right)^2, a\left(T+\frac{s}{2a}\right)^2\right].$$

where the width of the above range is 2sT.

Figure 3A:
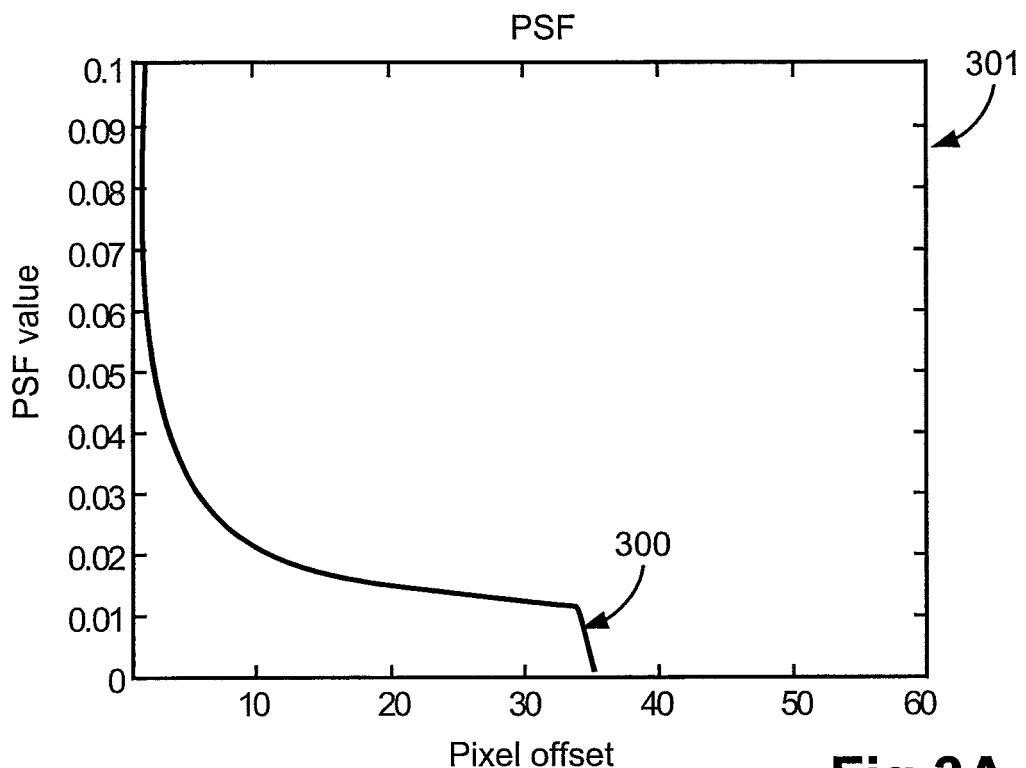
FIG. 3A shows a graph of a point spread function (PSF) for the object of FIG. 1A.

FIG. 3A is a graph 301 of the point spread function curve for a stationary point source (i.e., object 120), the image 110 of which is accelerated across the sensor 100 at a constant rate of acceleration as shown in FIG. 1A. Parameter values for initial speed, acceleration and exposure time, chosen for the example of FIG. 3A result in the point source (i.e., object 120) traversing thirty five (35) pixels in one direction followed by thirty five (35) pixels in the opposite direction. Discontinuity 300, at pixel offset thirty five (35), corresponds to the opening and closing of a shutter which determines the exposure period. Different parameter values will result in different pixel offsets.

Figure 3B:
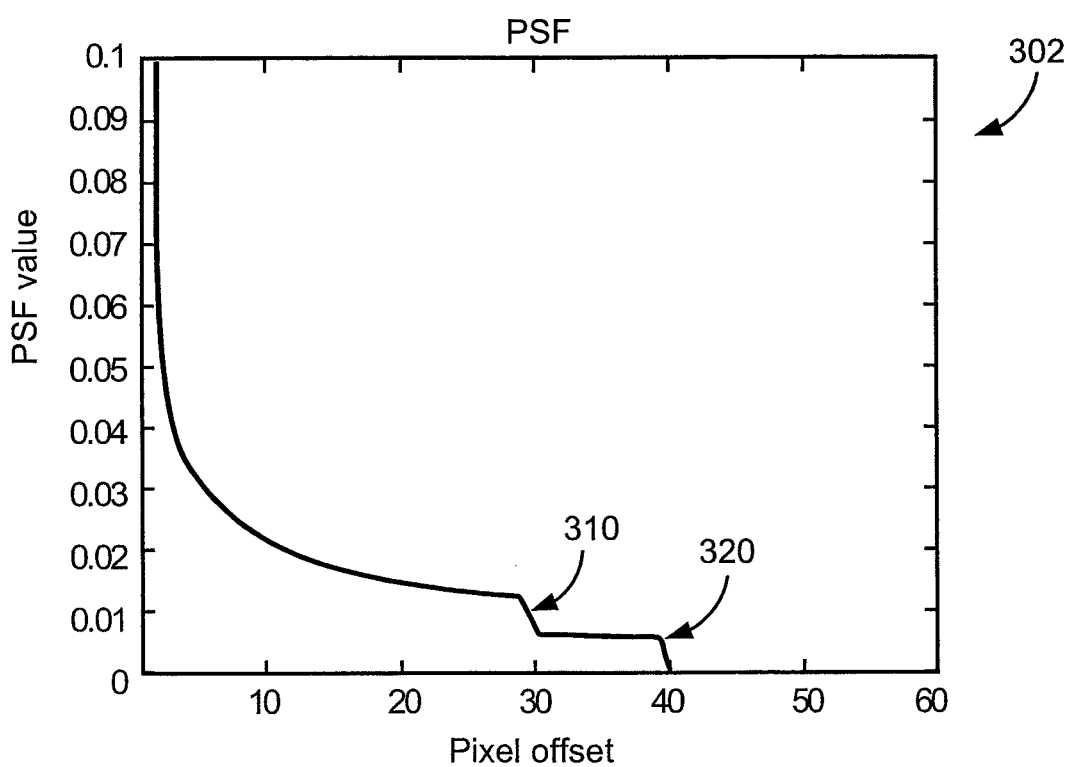
FIG. 3B shows a graph of a point spread function for the object of FIG. 1B.

FIG. 3B is a graph 302 showing a point spread function curve for a point source (i.e., object 130), moving with a fixed speed, the image 140 of which is accelerated across the sensor 100 at a fixed rate of acceleration as shown in FIG. 1B. For a speed parameter value chosen for the example of FIG. 3B, the point source displacement over the exposure period is forty (40) pixels in one direction and thirty (30) pixels in the reverse direction. As seen in FIG. 3B, two discontinuities 310 and 320 result for the image 140. The location of the discontinuities 310 and 320 depends on the speed of the object 130.

The graphs 301 and 302 of FIGS. 3A and 3B are examples and the discontinuities (e.g., 310, 320) will still arise if the acceleration is not constant.

Figure 4A:
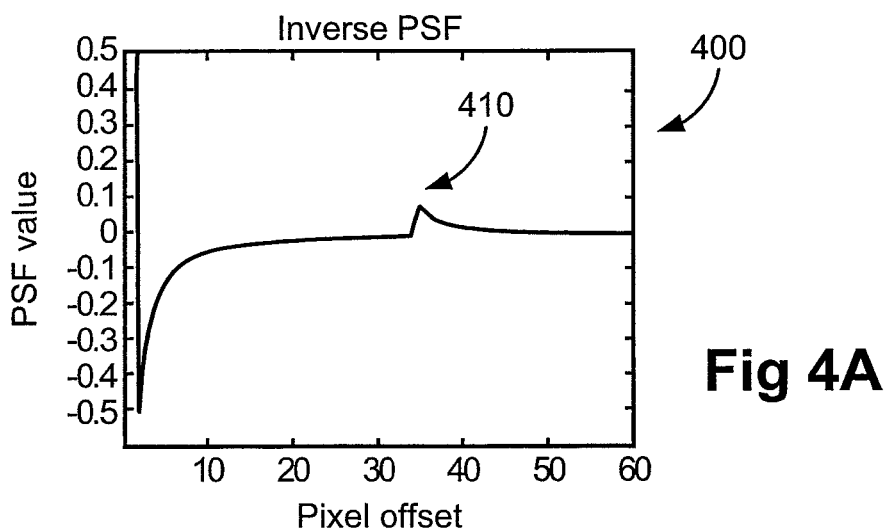
FIG. 4A shows a graph of the inverse point spread function for the object of FIG. 1A.

FIG. 4A shows a graph 400 of the inverse point spread function curve for a finite exposure of a stationary point source (i.e., the object 120) captured using the motion invariant method. De-blurring of stationary objects may be performed by the use of the inverse point spread function of FIG. 4A as a convolution filter. The point spread function curve of FIG. 4A comprises a small peak 410 due to the finite exposure period and corresponds to the step discontinuity in the blurring point spread function curve shown in the graph 300.

Figure 4B:
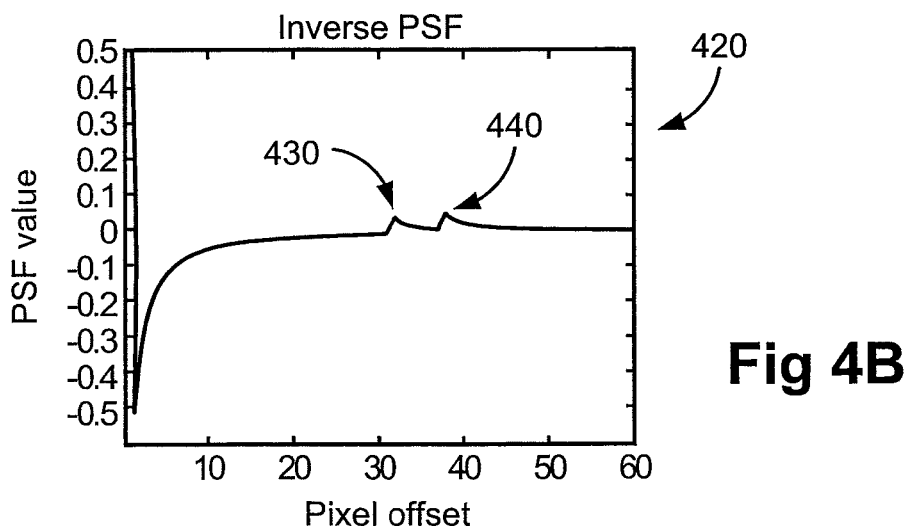
FIG. 4B shows a graph of the inverse point spread function for the object of FIG. 1B.

FIG. 4B shows a graph 420 of the inverse point spread function curve for a finite exposure of a moving point source (i.e., the object 130) captured using the motion invariant method. De-blurring of objects moving at a speed, corresponding to the speed parameter value of FIG. 3B, may be achieved using the inverse point spread function of graph 420 as a convolution filter. The two small peaks 430 and 440 of FIG. 4B either side of the zero speed peak location 410, are also due to the finite exposure period and correspond to the two step discontinuities 310 and 320 in the blurring point spread function of FIG. 3B.

Figure 4C:
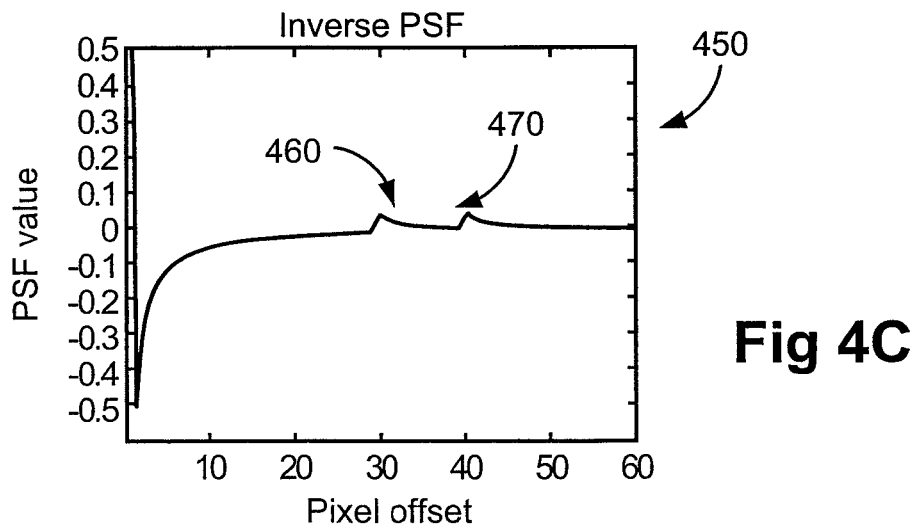
FIG. 4C shows a graph of the inverse point spread function for the object of FIG. 4B moving with a constant speed greater than the speed of the object as shown in FIG. 4B.

As a further indication of the effect of different object speeds, FIG. 4C shows a graph 450 of the inverse point spread function curve for a finite exposure of a quickly moving point source captured using the motion invariant method. Again there are two small peaks 460 and 470, with the separation between the peaks 460 and 470 increasing with object speed.

Other than the difference due to two peaks, the inverse point spread function curve, as shown in FIGS. 4A and 4C, is substantially identical for all object speeds. The use of an incorrect inverse point spread function for de-blurring leads to ghost-like artefacts at a distance from the source of the artefacts. The introduction of ghost-like artefacts may be understood by considering the application of an inverse filter to obtain a snapshot image, $image_{snapshot}$, in accordance with Equation (7), as follows:

$$image_{snapshot} = inverse\_psf * image_{blurred} \quad (7)$$

By separating the inverse point spread function, inverse_psf, into two components, in accordance with Equation (8), as follows:

$$image_{snapshot} = (inverse\_psf_{invariant} + inverse\_psf(s)_{variant}) * image_{blurred}. \quad (8)$$

Equation (8) may be expanded and rearranged to provide Equation (9) as follows:

$$inverse\_psf_{invariant} * image_{blurred} = image_{snapshot} + inverse\_psf(s)_{variant} * image_{blurred} \quad (9)$$

Hence, de-blurring with the single, spatially invariant point spread function results in the ideal snapshot image (i.e., $image_{snapshot}$) with another image superimposed. The nature of the superimposed image will now described with reference to FIGS. 5A, 5B and 5C.

Figure 5A:
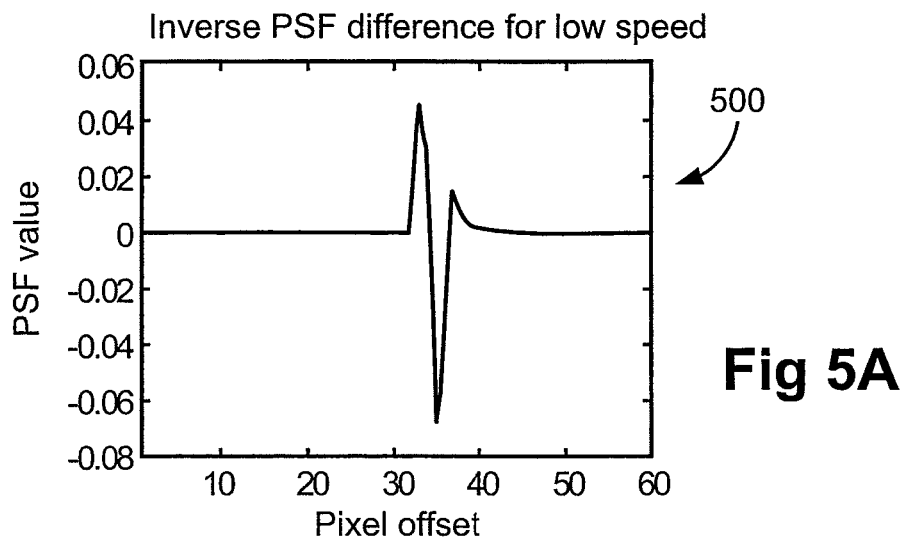
FIG. 5A shows a graph of the difference between two inverse point spread functions, corresponding to a stationary point source as shown in FIG. 4A, and a moving point source such as shown in FIG. 4B.

FIG. 5A shows a graph 500 of the difference between the inverse point spread function curves for an object having zero speed as in FIG. 4A and a slowly moving object as in FIG. 4B. The vertical scale of the graph 500 has been magnified from the vertical scale of the graphs in FIGS. 4A-4C to show the difference clearly.

Figure 5B:
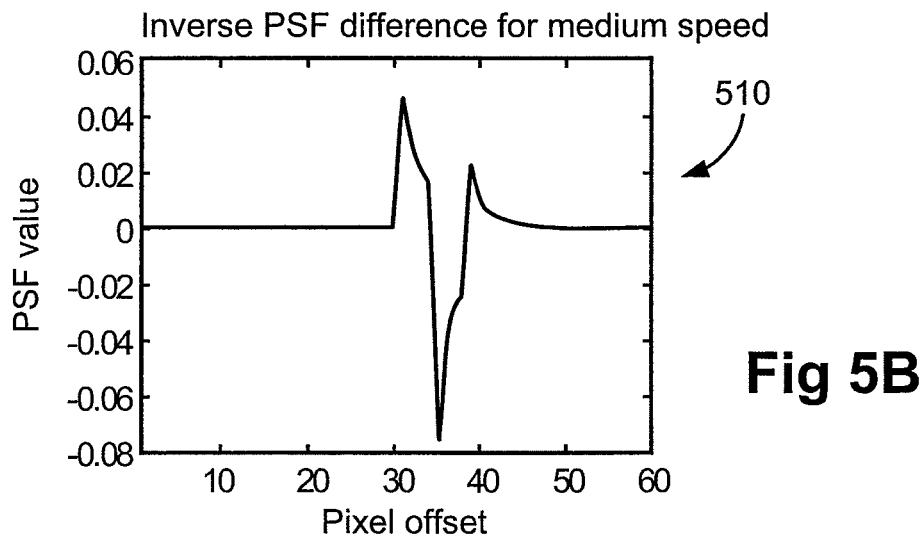
FIG. 5B shows a graph of the difference between two inverse point spread functions where the moving point source has a higher speed than in FIG. 5A.

FIG. 5B shows a graph 510 of the inverse point spread function curve difference for an object moving at an increased speed over the object of FIG. 4A.

Figure 5C:
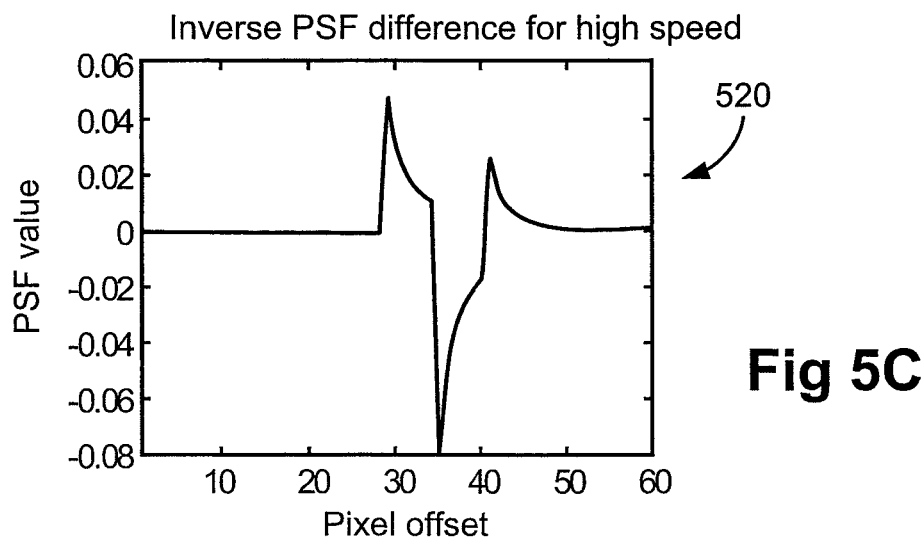
FIG. 5C shows a graph of the difference between two inverse point spread functions where the moving point source has a higher speed than in FIG. 5B.

FIG. 5C shows a graph 520 of the point spread function curve difference for a still faster moving object compared to the graph 510 of FIG. 5B. The point spread function curves of FIGS. 5A-5C are the spatially variant component of the inverse point spread function described above. The superimposed image, as described above, created by convolution with the blurred image has specific characteristics.

An example of a simple blurred image and the combination of the snapshot image, $image_{snapshot}$, and superimposed ghost-like image will now be described.

Figure 6A:
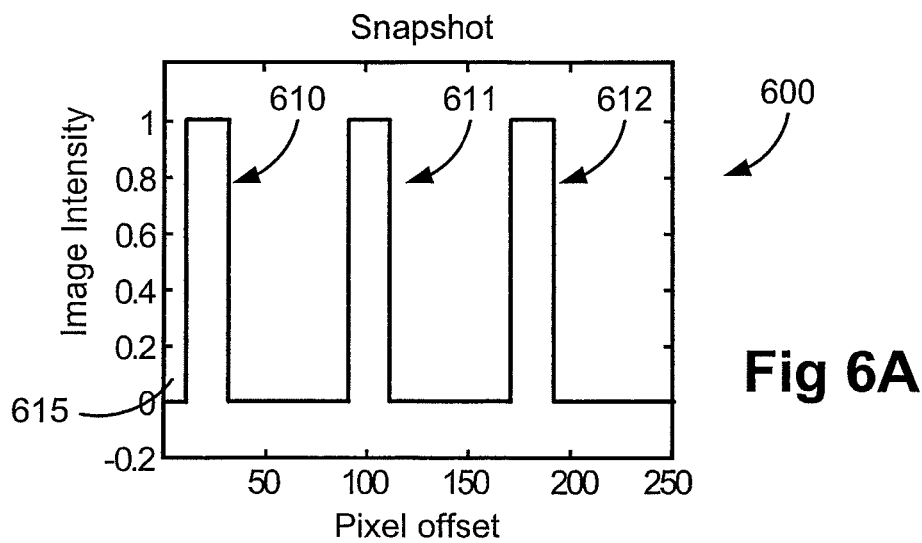
FIG. 6A shows a graph of a one-dimensional snapshot image.

FIG. 6A shows a graph 600 of a one-dimensional snapshot image. The graph 600 shows a line 615 through an ideal image containing three white bars on a black background. The snapshot image represented in FIG. 6A corresponds to a scene where three bars are moving at different speeds in a direction parallel to the line. The first bar 610 is moving at a slow speed, the second bar 611 is moving at a medium speed and the third bar 612 is moving at a higher speed.

Figure 6B:
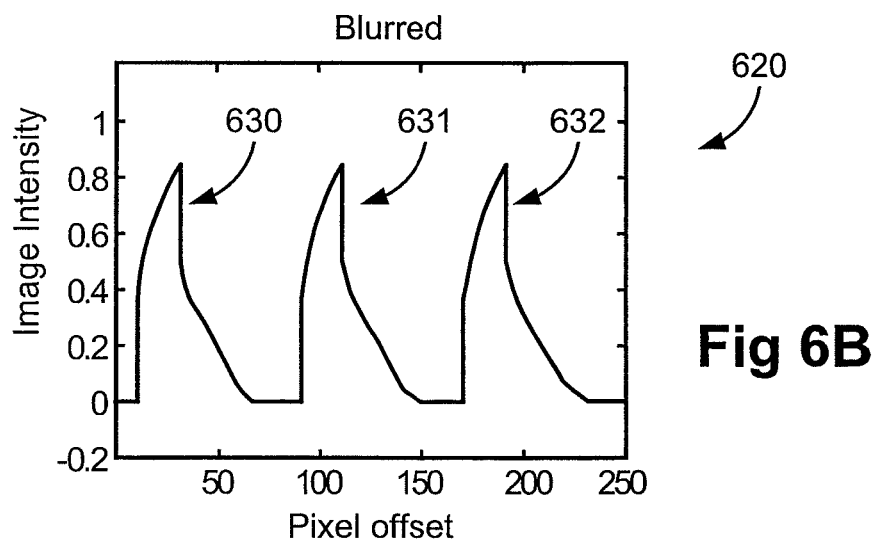
FIG. 6B shows a graph of the image of FIG. 6A captured by a motion invariant camera.

FIG. 6B shows a graph 620 of the image of FIG. 6A captured by a motion invariant camera to generate a blurred image. The graph 620 shows three blurred bars 630, 631 and 632 corresponding to the bars 610, 611 and 612, respectively.

Figure 6C:
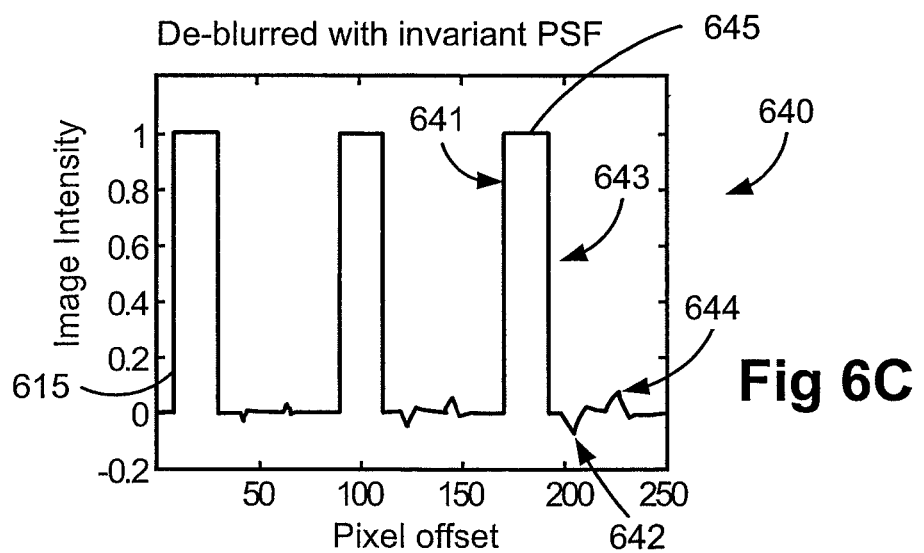
FIG. 6C shows a graph of a blurred image as shown in FIG. 6B, which has been de-blurred using a single, zero speed, inverse point spread function

FIG. 6C shows a graph 640 of the result of de-blurring the blurred image of FIG. 6B with a single, spatially invariant point spread function corresponding to zero speed. The graph 640 of FIG. 6C indicates how the resulting de-blurred image may be viewed as the snapshot image and a superimposed ghost image. As seen in FIG. 6C, a sudden change in image intensity due to leading edge 641 of third bar 645 results in a ghosting artefact 642. Similarly, trailing edge 643 of the third bar 645 results in another ghosting artefact 644. There are similar artefacts, at a lower magnitude, for the slower moving bars. The de-blurred snapshot image represented by the graph 640 of FIG. 6C may be referred to as a "ghosted" snapshot image.

A number of observations can be made from the graphs of FIGS. 6A to 6C. Firstly, the amplitude of the ghosting artefacts 642 and 644 is related to the magnitude of contrast change of the bar edges 641 and 643. Secondly, width of the ghosting artefacts 642 and 644 depends on the speed of the bar 645. Further, distance between the bar edge (e.g., 641) and the corresponding ghosting artefact (e.g., 642) is constant and independent of the speed of the bar 645. Still further, the ghosting artefacts 642 and 644 may result in intensity values less than zero and greater than one, as a result of the application of a de-blurring inverse filter (not shown). Finally, in general, ghosting artefacts only occur where there is a large change in intensity. In suitable images, the ghosting artefact may be separated from the snapshot image and identified.

To quantify the speed of the bar 645 associated with ghosting artefacts, possible locations and magnitude of ghosting artefacts may be detected using a filter. The filter is selected such that the filter has characteristics shared by a spatially variant inverse point spread function for any speed. Examples of spatially variant inverse point spread functions are shown in FIGS. 5A-C for three different bar speeds.

A filter comprising a filter kernel of [−1, 1], offset by fixed distance $aT^2$, acts as an edge detector. Similar filters will also achieve the desired response.

Figure 7A:
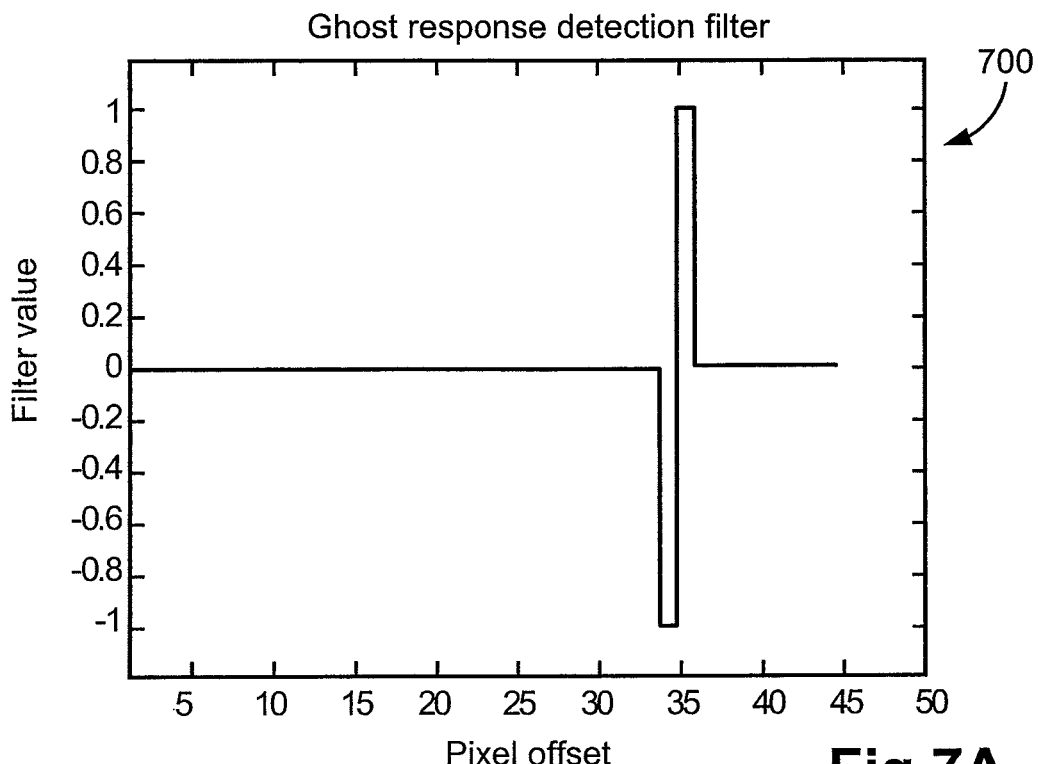
FIG. 7A shows a graph of a filter kernel used to detect ghosting artefacts.
Figure 7B:
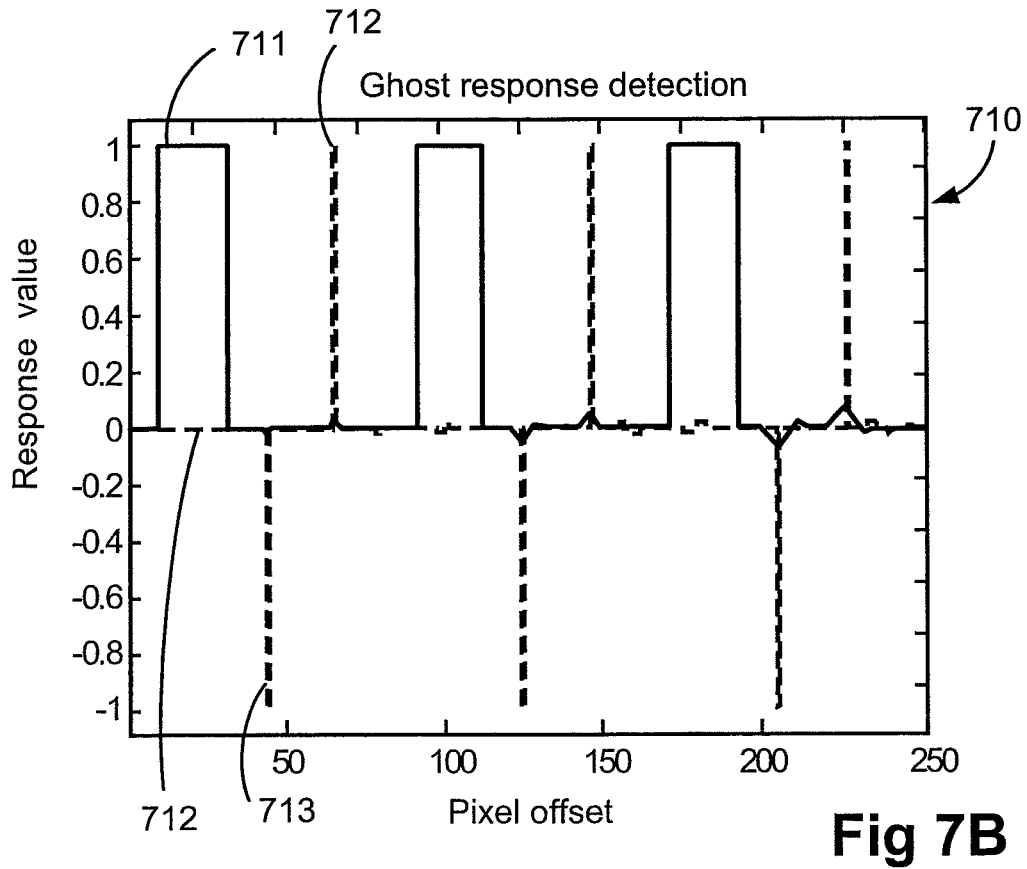
FIG. 7B shows a graph of a de-blurred image, overlaid with output of the ghosting artefact filter of FIG. 7A.

FIG. 7A shows a graph 700 of an edge filter kernel for an offset of thirty-five (35) pixels. The edge filter represented in FIG. 7A may be applied to the ghosted snapshot image (e.g., FIG. 6C). Graph 710 of FIG. 7B shows the output of the edge filter overlaid with a de-blurred image. Solid line 711 in FIG. 7B is the same as line 615 in FIG. 6C and dotted line 712 shows output of the ghosting artefact filter of FIG. 7A.

To estimate the speed of the bar 645 which generated the ghosting artefacts (e.g., 642, 644), a set of potential ghosting artefacts is created. The set of potential ghosting artefacts may be created by convolving the captured snapshot image (e.g., FIG. 6A) with a series of inverse point spread functions. The inverse point spread functions representing the inverse filter of FIG. 7A are generated by subtracting the inverse point spread function corresponding to zero speed from the inverse point spread function for a test (or estimation) speed. An alternative is to create a speed dependent ghosting artefact within an iterative ghost matching algorithm.

Figure 8:
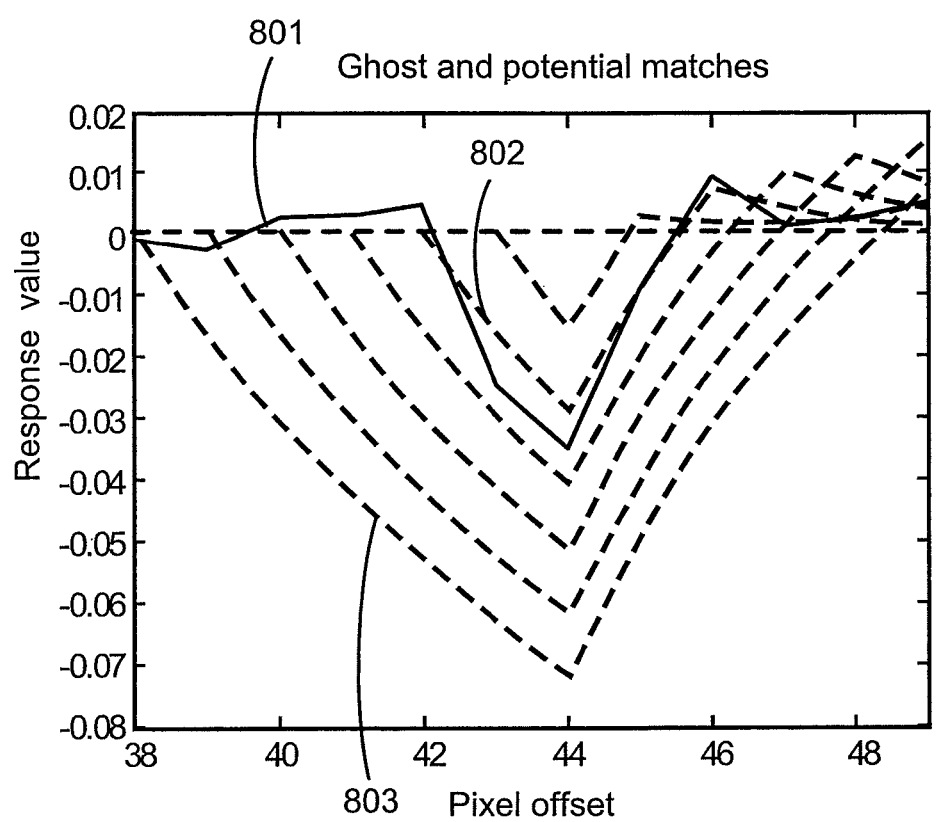
FIG. 8 shows in more detail a section of the graph of FIG. 7B and is a graph of a ghost-like artefact and several potential matches.

FIG. 8 shows a graph 800 of an interval surrounding the first peak location 713 of FIG. 7B at pixel displacement forty-four (44). Solid curve 801 is the ghosted snapshot image (i.e., FIG. 6C) and in the example of FIG. 8 is actually only the ghosting artefact as the additive background is black. Dotted curves (e.g., 802, 803) are potential matches of the solid curve 801, where there is one potential match for each speed of the bar 645. The matching of the dotted curves to the solid curve 801 will not be exact due to measurement noise. An algorithm may be applied to determine the speed of the bar 645 which results in a ghosting artefact best matching the ghosted snapshot image curve 801 over the interval of FIG. 8. The minimum of the absolute difference between the ghosted snapshot image curve 801 and each potential matching ghosting artefact curve (e.g., 802) may be used to determine the best match. A confidence level may be determined from the matching to avoid unreliable matches. If the confidence level is high, the matching ghosting artefact curve (e.g., 802) may be eliminated from the ghosted image curve 801 to remove the artefact. Such an elimination may be repeated for each identified potential ghosting artefact location. For artefacts which are not close to each other, elimination may be performed directly by subtracting the best matching ghosting artefact from the ghosted snapshot over the matching interval. For ghosting artefacts which are close together, a spatially varying point spread function may be determined and used to de-blur the captured image to achieve elimination.

The matching speed identified for each ghosting artefact location may be used to generate a map of speed points. By forming lines of equal speed, objects with the same speed may be segmented from a de-blurred image. The map of speed points may also be used to improve the matching of the solid curve 801 to each potential matching ghosting artefact curve (e.g., 802), as estimation errors may be removed due to the constraint of every point on an object having the same speed. Averaging over locations on a common object edge may also be used to reduce signal noise when finding a best ghosting artefact curve (e.g., 802) match.

The speed map may be used to generate an improved de-blurred image as a spatially varying point spread function can now be generated.

Figure 11A:
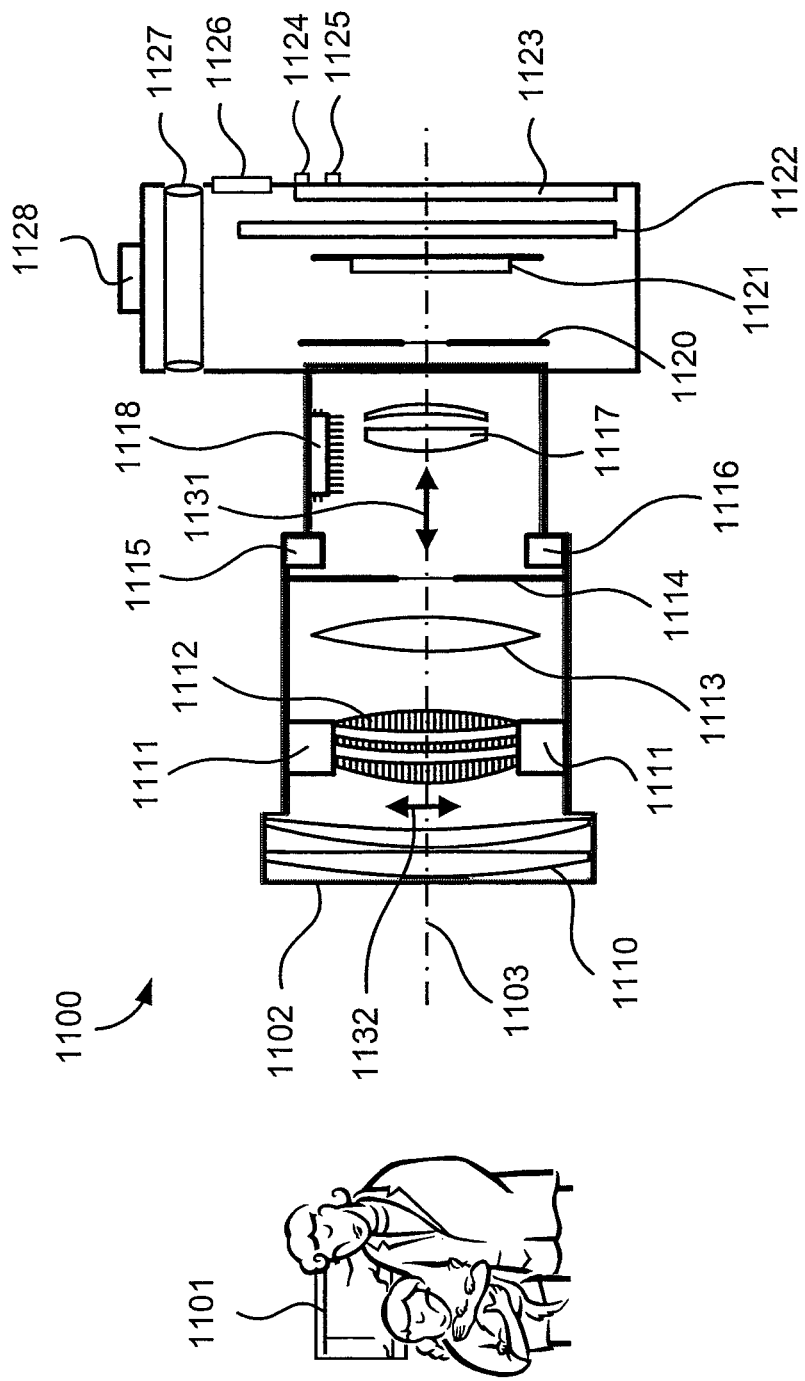
FIGS. 11A and 11B form a schematic block diagram of a digital camera system upon which described methods can be practiced.

FIG. 11A is a cross-section diagram of an image capture system 1100, upon which the various arrangements described can be practiced. The image capture system 1100 may be a digital still camera or a digital video camera (also referred to as a camcorder). The camera system 1100 is a motion invariant camera.

As seen in FIG. 11A, the camera system 1100 comprises an optical system 1102 which receives light from a scene 1101 and forms an image on a sensor 1121. The sensor 1121 comprises a two-dimensional (2D) array of pixel sensors which measure the intensity of the image formed on the sensor 1121 by the optical system 1102 as a function of position. The operation of the camera 1100, including user interaction and all aspects of reading, processing and storing image data from the sensor 1121 is coordinated by a main controller 1122 which comprises a special purpose computer system. The special purpose computer system is considered in detail below. A user is able to communicate with the controller 1122 via a set of buttons including a shutter release button 1128, used to initiate focus and capture of image data, and other general and special purpose buttons 1124, 1125, 1126 which may provide direct control over specific camera functions such as flash operation or support interaction with a graphical user interface presented on a display device 1123.

The display device 1123 may also have a touch screen capability to further facilitate user interaction. Using the buttons and controls it is possible to control or modify the behaviour of the camera 1100. Typically it is possible to control capture settings such as priority of shutter speed or aperture size when achieving a required exposure level, or area used for light metering, use of flash, ISO speed, options for automatic focusing and many other photographic control functions. Further, it is possible to control processing options such as colour balance or compression quality. The display 1123 is typically also used to review captured image or video data. It is common for a still image camera to use the display 1123 to provide a live preview of the scene, thereby providing an alternative to an optical viewfinder 1127 for composing prior to still image capture and during video capture.

The optical system 1102 comprises an arrangement of lens groups 1110, 1112, 1113 and 1117 which may be moved relative to each other along a line 1131 parallel to an optical axis 1103. The lens groups 1110, 1112, 1113 and 1117 are moved under control of a lens controller 1118 to achieve a range of magnification levels and focus distances for the image formed at the sensor 1121. The lens controller 1118 may also control a mechanism 1111 to vary the position, on any line 1132 in the plane perpendicular to the optical axis 1103, of a corrective lens group 1112. The mechanism 1111 is controlled in response to input from one or more motion sensors 1115, 1161 or the controller 1122 so as to shift the position of the image formed by the optical system 1102 on the sensor 1121. The corrective lens group 1112 may be used to effect an optical image stabilisation by correcting image position on the sensor 1121 for small movements of the camera 1100 such as those caused by hand-shake The optical system 1102 may further comprise an adjustable aperture 1114 and a shutter mechanism 1120 for restricting the passage of light through the optical system 1102. Although both the aperture 1114 and shutter mechanism 1120 are typically implemented as mechanical devices, the aperture 1114 and shutter mechanism 1120 may also be constructed using materials, such as liquid crystal, whose optical properties may be modified under the control of an electrical control signal. Such electro-optical devices have the advantage of allowing both shape and opacity of the aperture 1114 to be varied continuously under control of the controller 1122.

Figure 11B:
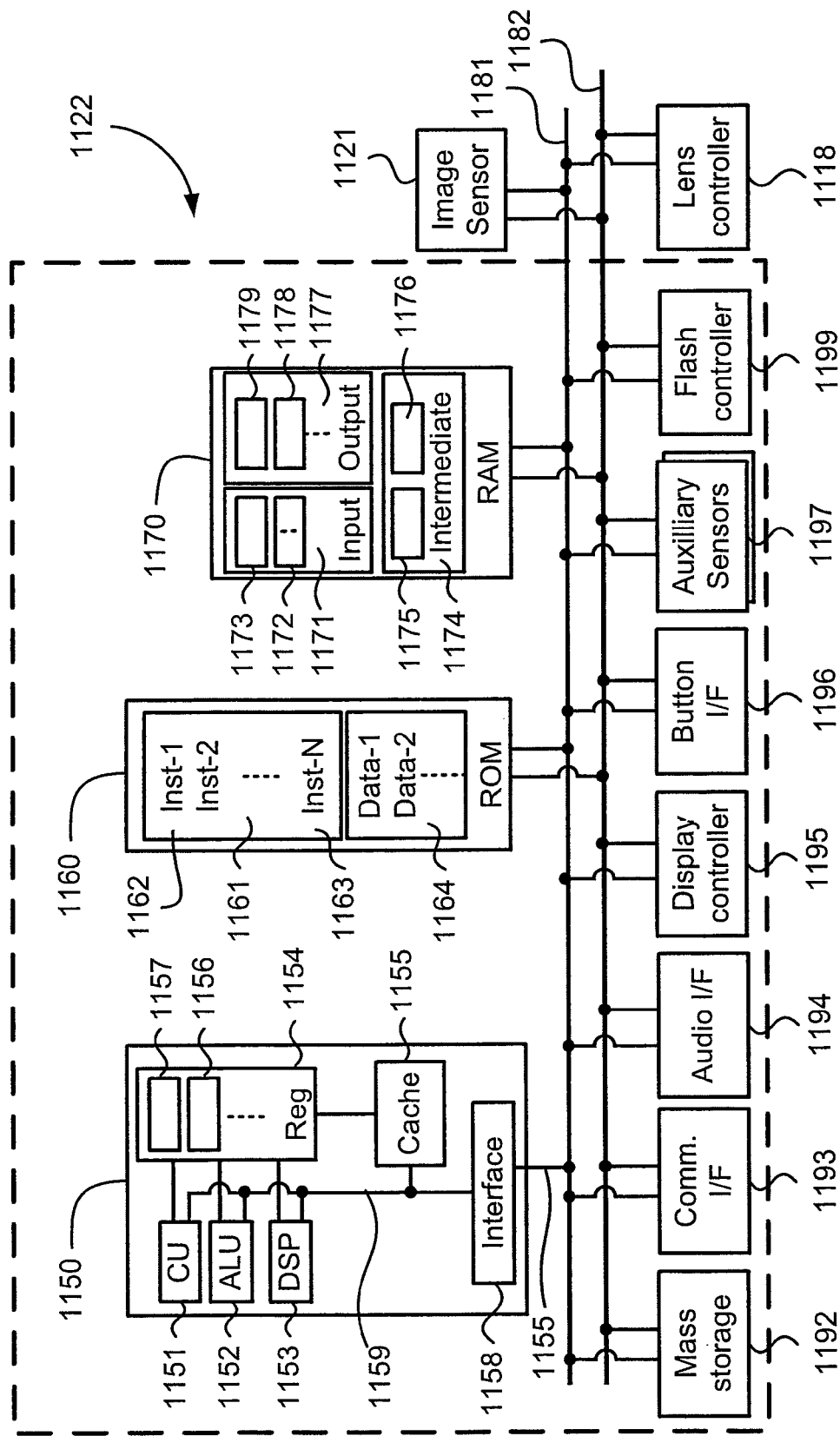

FIG. 11B is a schematic block diagram for the controller 1122 of FIG. 11B, in which other components of the camera system 1100, which communicate with the controller 1122, are depicted as functional blocks. In particular, the image sensor 1121 and lens controller 1118 are depicted without reference to their physical organisation or the image forming process and are treated only as devices which perform specific pre-defined tasks and to which data and control signals can be passed.

FIG. 11B also depicts a flash controller 1199 which is responsible for operation of a strobe light that may be used during image capture in low light conditions as auxiliary sensors 1197 which may form part of the camera system 1100. Auxiliary sensors may include orientation sensors that detect if the camera 1100 is in a landscape or portrait orientation during image capture; motion sensors that detect movement of the camera 1100; other sensors that detect the colour of the ambient illumination or assist with autofocus and so on. Although the auxiliary sensors are depicted as part of the controller 1122, the auxiliary sensors may in some implementations be implemented as separate components within the camera system 1100.

The controller 1122 comprises a processing unit (or processor) 1150 for executing program code. The controller 1122 also comprises Read Only Memory (ROM) 1160 and Random Access Memory (RAM) 1170 as well as non-volatile mass data storage 1192. In addition, at least one communications interface 1193 is provided for communication with other electronic devices such as printers, displays and general purpose computers. Examples of communication interfaces include USB, IEEE1394, HDMI and Ethernet. An audio interface 1194 comprises one or more microphones and speakers for capture and playback of digital audio data. A display controller 1195 and button interface 1196 are also provided to interface the controller 1122 to the physical display 1123 and controls present on the camera body. The components are interconnected by a data bus 1181 and control bus 1182.

In a capture mode, the controller 1122 operates to read data from the image sensor 1121 and audio interface 1194 and manipulate that data to form a digital representation of a scene. The digital representation may be stored in the non-volatile mass data storage 1192. In the case of a still image camera, image data may be stored using a standard image file format such as JPEG or TIFF. Alternatively, the image data may be encoded using a proprietary raw data format that is designed for use with a complimentary software product that would provide conversion of the raw format data into a standard image file format. Such software would typically be resident and executed on a general purpose computer. For a video camera, the sequences of images that comprise the captured video are stored using a standard format such DV, MPEG, H.264. Some of these formats are organised into files such as Audio Video Interleave (AVI) referred to as container files, while other formats such as DV, which are commonly used with tape storage, are written as a data stream.

The non-volatile mass data storage 1192 is used to store the image or video data captured by the camera system 1100 and, together with the ROM 1160 and RAM 1170, is an example of "computer readable storage media". The term computer readable storage media also refers to any storage medium that participates in providing instructions and/or data to the camera system 1100 for execution and/or processing. Examples of such storage media may include but are not limited to removable flash memory such as a compact flash (CF) or secure digital (SD) card, memory stick, multimedia card, miniSD or microSD card; optical storage media such as writable CD, DVD or Blu-ray disk; or magnetic media such as magnetic tape or hard disk drive (HDD) including very small form-factor HDDs such as microdrives. The choice of mass storage depends on the capacity, speed, usability, power and physical size requirements of the particular camera system. Other examples of computer readable storage media suitable for use with a general purpose computer are floppy disks, magnetic tape, CD-ROM, a hard disk drive, a ROM or integrated circuit, USB memory, a magneto-optical disk, or a computer readable card such as a PCMCIA card and the like, whether or not such devices are internal or external of such a camera system.

In a playback or preview mode, the controller 1122 operates to read data from the mass storage 1192 and present that data using the display controller 1195 and audio interface 1194.

The processor 1150 is able to execute programs stored in one or both of the connected memories 1160 and 1170. When the camera system 1100 is initially powered up system program code 1161, resident in ROM memory 1160, is executed. The system program code 1161 permanently stored in the ROM memory 1160 is sometimes referred to as firmware. Execution of the firmware by the processor 1150 fulfils various high level functions, including processor management, memory management, device management, storage management and user interface.

The processor 1150 includes a number of functional modules including a control unit (CU) 1151, an arithmetic logic unit (ALU) 1152, a digital signal processing engine (DSP) 1153 and a local or internal memory comprising a set of registers 1154 which typically contain atomic data elements 1156, 1157, along with internal buffer or cache memory 1155. One or more internal buses 1159 interconnect these functional modules. The processor 1150 typically also has one or more interfaces 1158 for communicating with external devices via the system data 1181 and control 1182 buses using a connection 1155.

The system program 1161 includes a sequence of instructions 1162 though 1163 that may include conditional branch and loop instructions. The program 1161 may also include data which is used in execution of the program. This data may be stored as part of the instruction or in a separate location 1164 within the ROM 1160 or RAM 1170.

In general, the processor 1150 is given a set of instructions which are executed therein. This set of instructions may be organised into blocks which perform specific tasks or handle specific events that occur in the camera system 1100. Typically the system program will wait for events and subsequently execute the block of code associated with that event. This may involve setting into operation separate threads of execution running on independent processors in the camera system 1100 such as the lens controller 1118 that will subsequently execute in parallel with the program running on the processor 1150. Events may be triggered in response to input from a user as detected by the button interface 1196. Events may also be triggered in response to other sensors and interfaces in the camera system.

The execution of a set of the instructions may require numeric variables to be read and modified. Such numeric variables are stored in RAM 1170. The disclosed method uses input variables 1171 that are stored in known locations 1172, 1173 in the memory 1170. The input variables are processed to produce output variables 1177 that are stored in known locations 1178, 1179 in the memory 1170. Intermediate variables 1174 may be stored in additional memory locations in locations 1175, 1176 of the memory 1170. Alternatively, some intermediate variables may only exist in the registers 1154 of the processor 1150.

The execution of a sequence of instructions is achieved in the processor 1150 by repeated application of a fetch-execute cycle. The control unit 1151 of the processor 1150 maintains a register called the program counter which contains the address in memory 1160 of the next instruction to be executed. At the start of the fetch execute cycle, the contents of the memory address indexed by the program counter is loaded into the control unit. The instruction thus loaded controls the subsequent operation of the processor, causing for example, data to be loaded from memory into processor registers, the contents of a register to be arithmetically combined with the contents of another register, the contents of a register to be written to the location stored in another register and so on. At the end of the fetch execute cycle the program counter is updated to point to the next instruction in the program. Depending on the instruction just executed this may involve incrementing the address contained in the program counter or loading it with a new address in order to achieve a branch operation.

Each step or sub-process in methods described below are associated with one or more segments of the program 1161, and is performed by repeated execution of a fetch-execute cycle in the processor 1150 or similar programmatic operation of other independent processor blocks in the camera system 1100.

Figure 9:
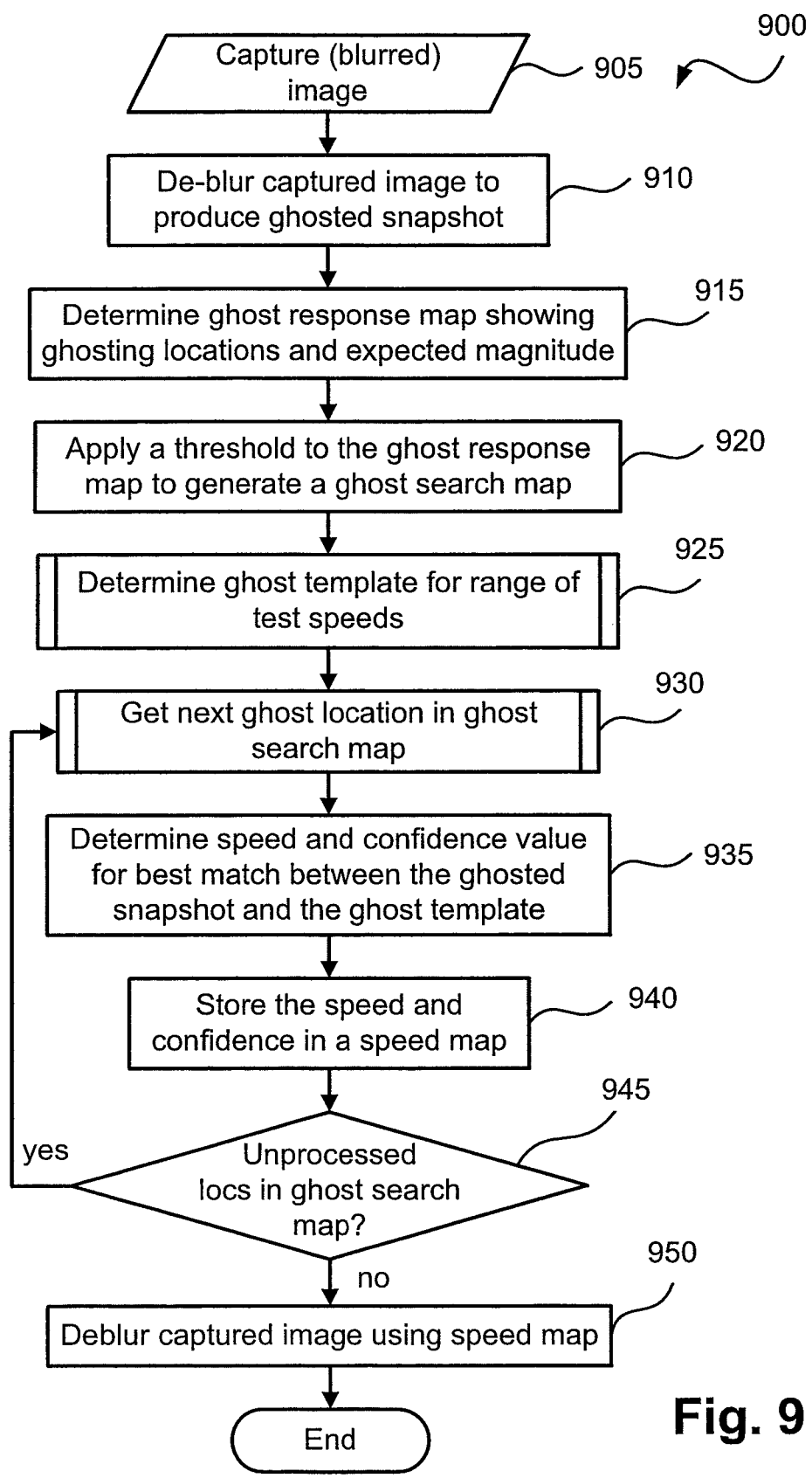
FIG. 9 is a flow diagram showing a method of de-blurring a captured image.
Figure 10A:
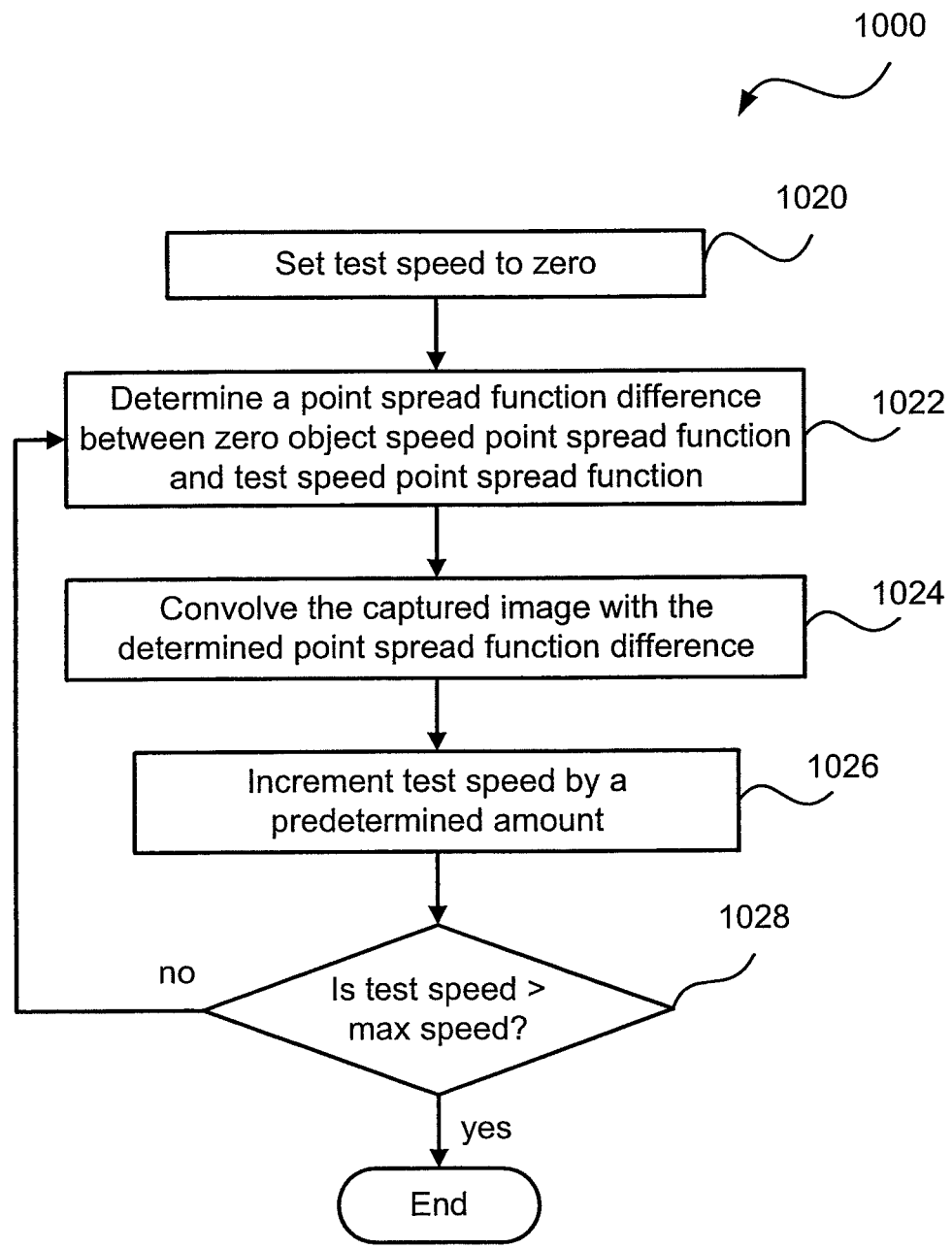
FIG. 10A is a flow diagram showing a method of determining ghost matching data, as executed in the method of FIG. 9.
Figure 10B:
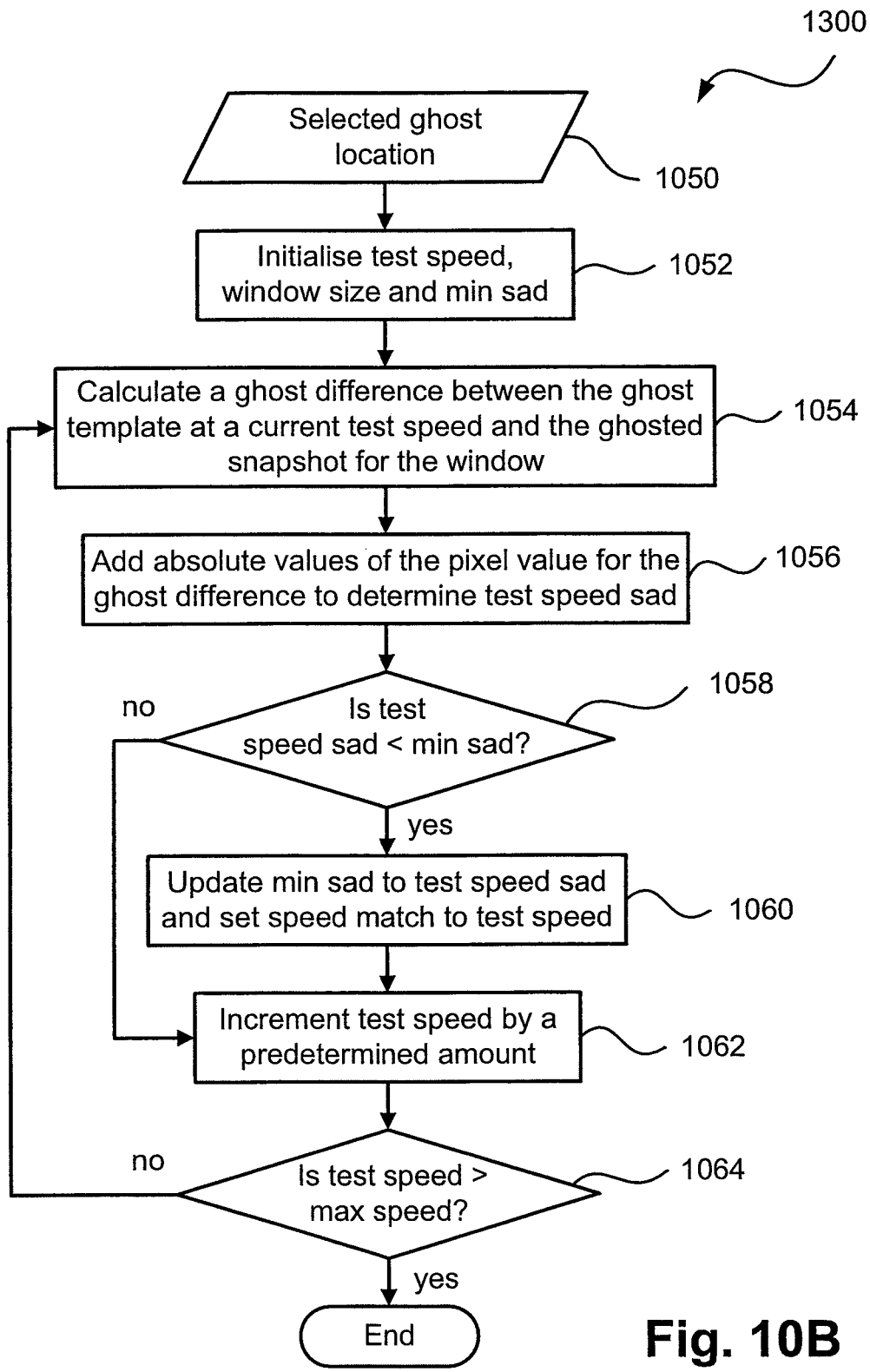
FIG. 10B is a flow diagram showing a method determining a best matching speed and confidence value, as executed in the method of FIG. 9.
Figure 12:
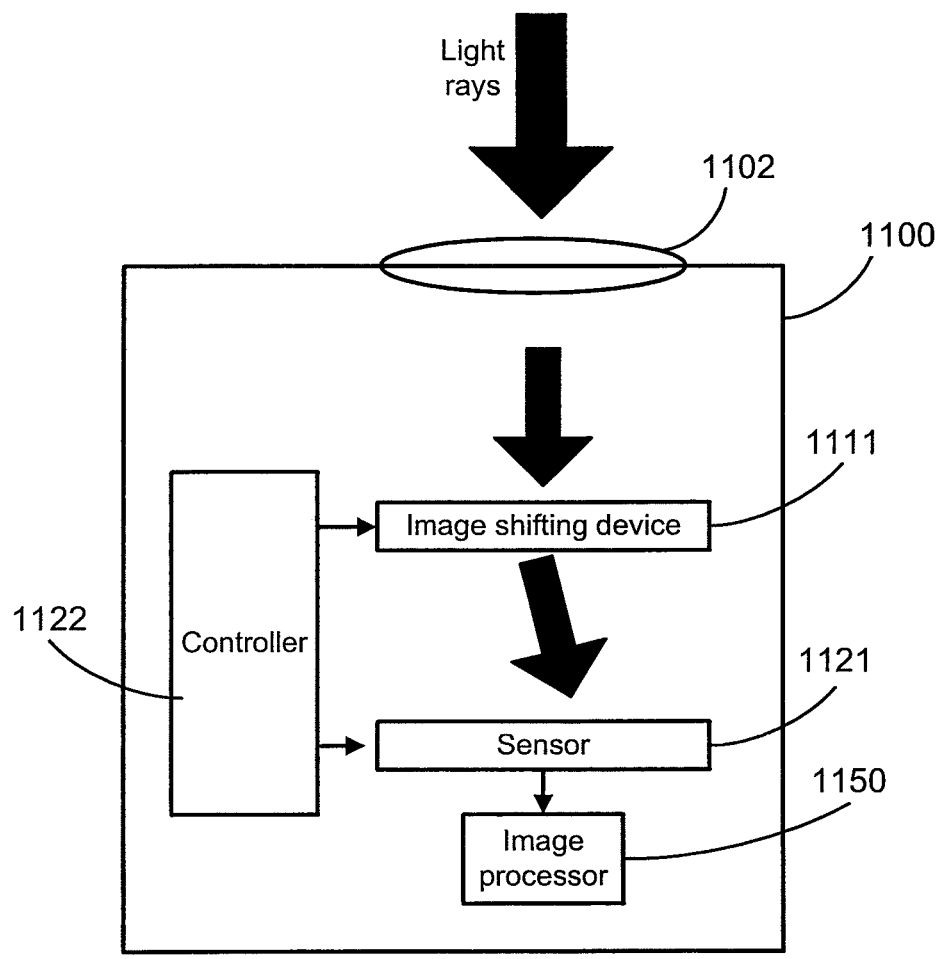
FIG. 12 shows selected components of the digital camera system of 11A, upon which one or more of the described methods can be practiced.

FIG. 12 is a block diagram of the digital camera system 1100 of FIG. 11A, which shows only selected elements relevant to capturing an image which is processed according to one or more of the described methods including the methods 900 (see FIG. 9), 1000 (see FIG. 10A) and 1300 (see FIG. 10B). The remaining components shown in FIG. 11A, as well as any additional components used in the normal camera operation are not included in FIG. 12 for clarity.

Light entering the camera 1100 is focused by the optical system 1102 on the sensor 1121 and subsequently processed by the image processor 1150 to obtain a restored image. The image processor 1150 is usually identical with the main controller 1122 running the standard camera functionality, but can also be a separate dedicated processor. The image processor 1150 need not be contained within the camera 1100 and image restoration may be performed in another device such as a general purpose computer. Prior to reaching the sensor 1121, light may pass through the mechanism 1111 (or image shifting device) which causes a variable translation of the image with respect to the sensor 1121. In one embodiment, the mechanism 1111 is a movable lens element normally used for image stabilisation. The mechanism 1111 allows shifting the location of the image on the sensor 1121. Image stabilisation may be performed in conjunction with the image shifting operation.

In one embodiment, image shifting may be performed by moving the sensor 1121 and not the image. Moving the image sensor 1121 during exposure may be used for image stabilisation and such a function may be combined with the shifting operation described above. The shifting of the sensor 1121 may be performed by mechanical arrangements that enable the amount of shift to be modified by the controller 1122 during the exposure. Alternatively, the amount of shift may be modified by the lens controller 1118. Also, FIG. 12 shows the image shifting device 1111 located inside the camera 1100. However, the image shifting device 1111 may also be placed inside the lens assembly, for example in the case of a removable lens.

FIG. 9 is a flow chart showing a method 900 of de-blurring a captured image. The method 900 may be used for removing an artefact from a de-blurred image captured with a motion invariant camera (e.g., the camera system 1100). As described below, the method 900 may be implemented as one or more code modules of the software program resident within the ROM 1160 of the camera 1100 and being controlled in its execution by the processor 1150. In particular, the steps of the method 900 may be effected by the instructions 1162-1163 in the software that are carried out within the camera system 1100.

Alternatively, the method 900 may be implemented as one or more software code modules of the complimentary software product resident on and being executed by a processor of a general purpose computer as described above. Examples of computers on which the method 900 can be practised include IBM-PC's and compatibles, Sun Sparcstations, Apple Mac™ or alike computer systems evolved therefrom.

The method 900 begins at step 905, where the processor 1150, in conjunction with the other components including the sensor 1121, captures a blurred image. The blurred image may also be referred to as the captured image. The blurred image may be stored in RAM 1170. A motion invariant point spread function for the blurred image depends on three parameters in the form of trajectory of motion of the image over the sensor 1121, constant of acceleration of the motion and the exposure time. The parameters are acquired by the processor 1150, at step 905, as metadata associated with the blurred image. The trajectory of motion, constant of acceleration and exposure time parameters, may be stored in the RAM 1170. The trajectory of motion, constant of acceleration and exposure time parameters, also determine a maximum speed of moving objects that may be determined according to the method 900. For ease of explanation, the method 900 will be described with reference to the processing of a single line of pixels in the direction of motion. However, the steps of the method 900 are repeated for each line in turn for a two-dimensional (2D) input image.

At step 910, the processor 1150 performs the step of de-blurring the blurred image (or captured image) stored in RAM 1170 using a spatially invariant blur kernel. In particular, the blurred image is de-blurred based on the zero speed, spatially invariant point spread function of Equation (5). Since the inverse point spread function shrinks quickly and smoothly to zero, other than at one discontinuous region as shown in FIG. 4A, the inverse point spread function is used directly as a filter to obtain the de-blurred image. The inverse point spread function is obtained from the point spread function according to Equation (10), as follows:—

$$\text{inverse\_psf} = \mathit{ifft}\left(\frac{1}{\mathit{fft}(\mathit{psf})}\right) \qquad (10)$$

where fft denotes a fast Fourier transform and ifft an inverse fast Fourier transform.

The point spread function is determined according to Equation (5) previously described in relation to FIG. 2B. The de-blurred image obtained at step 910 is termed the "ghosted snapshot" image as represented in FIG. 6C in one example.

At step 915, the processor 1150 performs the step of applying an edge filter with a fixed offset to the de-blurred image to identify the location of at least one ghosting artefact. In particular, the processor 1150 determines locations at which ghosting (or the ghosting artefact) may occur, along with expected magnitude of the ghosting, by convolving the ghosted snapshot image with the edge filter. A kernel associated with the edge filter used at step 915 is [−1,1], offset by $aT^2$ in the direction of motion invariant capture. The result of the convolution operation at step 915 is termed a "ghost response map". Step 915 identifies the potential location of ghosting within the captured image. As the ghosting occurs at a fixed offset, the ghosting may be identified without interference from an object with which the ghosting is associated. The ghost response map may be stored in the RAM 1170.

At step 920, a threshold is applied by the processor 1150 to the ghosted response map. Locations above a threshold value are stored in a "ghost search map" generated by the processor 1150 within RAM 1170. The threshold is a predetermined value, based on expected noise in the captured image and, in one embodiment, is 20% of a maximum possible ghost response value. A sharp transition from minimum to maximum intensity (black to white) in the ghost snapshot image causes a maximal ghost response.

At step 925, the processor 1150 performs the step of determining ghost matching data for all potential object speeds associated with the captured image. The determined data is termed a "ghost template". The ghost template may be stored within RAM 1170. A method 1000 of determining ghost matching data for all potential object speeds, as executed at step 925, will be described in detail below with reference to FIG. 10A.

At step 930, the processor 1150 determines a next ghost location in the ghost search map stored within RAM 1170. As described below, each location in the "ghost search map" is used to select a region in the "ghosted response map" which is compared to the same region in the "ghost template".

Then at the next step 935, the processor 1150 performs the step of estimating a parameter based on a region either side of the ghosting location determined in step 930. The parameter represents speed of a moving object in the captured image. In particular, the processor 1150 determines a best matching speed in the ghost template. A confidence value is also determined for the best matching speed.

A method 1300 of determining a best matching speed and confidence value, as executed at step 935, will be described in detail below with reference to FIG. 10B. As will be described, the estimation is performed by comparing an interval of the de-blurred image with a corresponding interval of a signal obtained by applying an inverse difference filter to the blurred image (or captured image).

The speed, confidence level and ghost location are stored by the processor 1150 in a "speed map" configured within RAM 1170, at step 940. If there are unprocessed entries in the "ghost search map", at step 945, then the method 900 returns to step 930. Otherwise, at the next step 950, the processor 1150 performs the step of removing the ghosting artefact from the de-blurred image using the best matching speed parameter determined at step 935. In particular, the data stored in the "speed map" is processed by the processor 1150 to generate a de-blurred version of the captured image. The speed map may be pre-processed to obtain the boundaries of moving objects and speeds associated with the moving objects. The object boundaries and speeds associated with the moving objects may then be used to calculate a spatially varying point spread function according to Equation (5) described above in relation to FIG. 2B. Morphological techniques may be applied to the speed map to obtain the object boundaries. Also at step 950, a de-blurred version of the captured image, without ghosting artefacts, is determined by de-blurring the captured image with the spatially varying point spread function.

The method 1000 of determining ghost matching data for all potential object speeds, as executed at step 925, will now be described with reference to FIG. 10A. The method 1000 may be implemented as one or more code modules of the software program resident within the ROM 1160 of the camera 1100 and being controlled in its execution by the processor 1150. Alternatively, the method 1000 may be implemented as one or more software code modules of the complimentary software product resident on and being executed by a processor of a general purpose computer as described above.

The "ghost template" is generated in the method 1000. A range of possible speeds is selected which may be later assigned to object motion.

The method 1000 begins at step 1020, where a "test speed" variable configured within RAM 1170 is set to zero. Then at step 1022, the processor 1150 determines a difference between two inverse point spread functions. The first inverse point spread function corresponds to zero object speed and the second inverse point spread function corresponds to the value of the "test speed" variable. At step 1024, the captured image, is convolved with the difference determined at step 1022. The result is stored within RAM 1170 in a ghost template for the current value of the test speed variable.

Next, at step 1026, the test speed variable within RAM 1170 is increased by a predetermined amount. The predetermined amount is determined according to required accuracy of the object speed estimation. A smaller increase will result in a greater accuracy while taking a longer time to calculate while a larger increase will result in lower accuracy with a decrease in calculation time.

At step 1028, the next test speed value is selected by the processor 1150 and the method 1000 returns to step 1022 until all speeds have been processed. All speeds are processed once the test speed reaches a maximum speed value (max speed). The maximum speed value may be determined by the maximum possible speed described above. Accordingly, if the processor 1150 determines that the value of the test speed variable is greater than max speed, then the method 1000 concludes.

The method 1300 of determining a best matching speed and confidence value, as executed at step 935, will now be described with reference to FIG. 10B. The method 1300 may be implemented as one or more code modules of the software program resident within the ROM 1160 of the camera 1100 and being controlled in its execution by the processor 1150. Alternatively, the method 1300 may be implemented as one or more software code modules of the complimentary software product resident on and being executed by a processor of a general purpose computer as described above.

The method 1300 is used to perform curve matching between a window of the ghosted snapshot image about a selected location and a corresponding window stored in the ghost template. In particular, the method 1300 is used to determine the best matching speed.

The method 1300 begins at step 1050, where the processor 1150 accesses the ghost location obtained from the ghost search map as selected at step 930. Then at step 1052, local variables are initialised within RAM 1170. In particular, test speed is set to zero, a region window about the ghost location is set to 2*T*max_speed and a minimum sum of absolute differences value (sad) is set to an arbitrary high initial value.

At step 1054, the processor 1150 selects ghost template values for a current test speed over the window surrounding the input ghost location. The ghosted snapshot image values over the window are then subtracted from the ghost template value and stored as a ghost difference within RAM 1150. The sum of absolute values of the ghost difference is calculated at step 1056 to determine a "sad" for the current test speed. At step 1058, the sum determined at step 1056 is tested against a "min sad" value. If the sum determined at step 1056 is less than the min sad value, then the method 1300 proceeds to step 1060. Otherwise, the method 1300 proceeds to step 1062. At step 1060, the processor 1150 sets "min sad" to the smaller value and sets the best speed match value to value of the current "test speed" variable.

At step 1062, the current test speed is increased in a similar manner to step 1026 as described above. Then at step 1064, the method 1300 returns to step 1054 until all test speed values have been checked. Accordingly, if the processor 1150 determines that the value of the test speed variable is greater than max_speed, then the method 1300 concludes. Otherwise, the method 1300 returns to step 1054.

Following execution of the method 1300, the speed match value is returned as a best speed match value along with an optional confidence value. The confidence value is determined based on the value of the "min sad". In the example shown in FIG. 8, the region is six (6) pixels to the left of pixel location forty-four (44) and five (5) pixels to the right. One measure of confidence may be obtained by subtracting from one, the ratio of the minimum and maximum values for the sum of absolute differences calculated. If the captured image has high levels of noise or varies significantly over the region where the ghosting is being searched, a low confidence level is assigned.

A single PSF may be used to de-blur an image containing objects moving at different speeds. If the PSF of FIG. 3A is used in place of the PSF of FIG. 3B for de-blurring, an error will occur due to the different locations of discontinuities. The error will typically be a ghosting artefact at a pixel offset in the range 30-40 pixels.

It has to be noted that the graphs of FIGS. 3A and 3B are examples and the discontinuities will still arise if the acceleration is not constant.

A method is described below which uses an image intensity attenuation function providing a general indication of how much incident image light is transformed into an output signal of the sensor 1121 sensing the image over the exposure period. In one embodiment, the means effecting the image intensity attenuation function comprises a light attenuation device, having an image signal transmission function, m(t), the value of which varies during the exposure period. When all light is blocked, the image signal transmission function is defined as having value zero (0). When all light is passed, the image signal transmission function is defined as having value one (1). Values between zero (0) and one (1) constitute partial light intensity transmission. The purpose of the introduction of an image signal transmission function is to remove the discontinuities 300, 310 and 320, shown in FIGS. 3A and 3B. The discontinuities 300, 310 and 320 are removed by smoothly fading in and fading out the light intensity captured by the sensor 1121 during the exposure period. The described method performs steps for providing the image intensity attenuation function that results in a formed image having such a gradual fade in and fade out over the exposure period. When attenuated in such a manner, the PSF is the result of multiplying the PSF due to motion with the transmission function expressed as a function of displacement, x, in accordance with Equation (11), as follows:

$$PSF_a(x) = PSF(x) \cdot m'(x) \quad (11)$$

Figure 13:
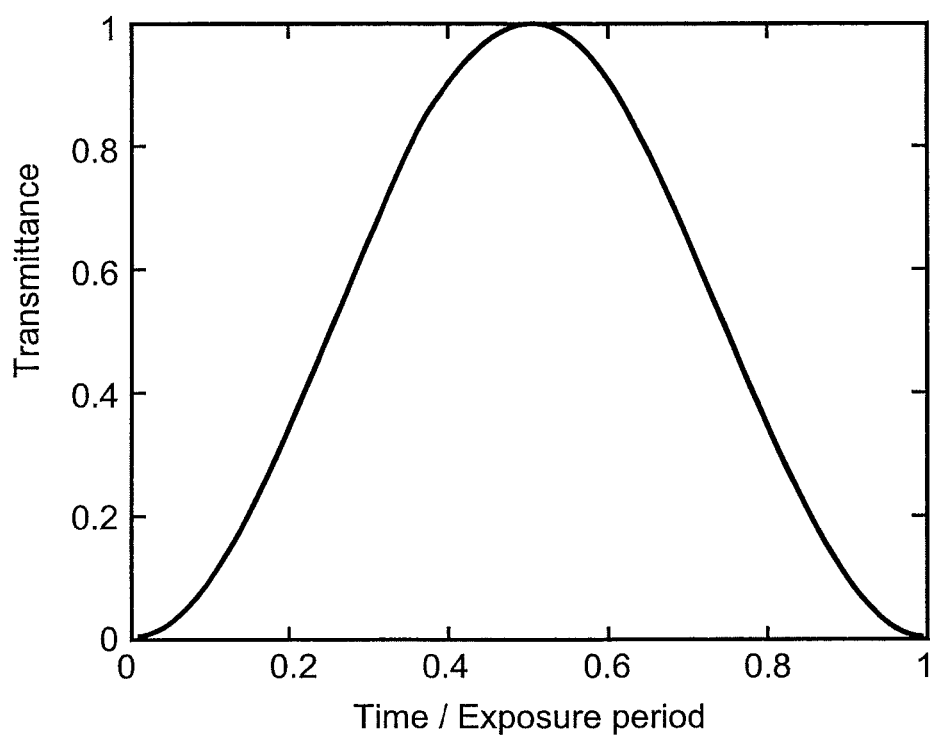
FIG. 13 shows an example of a light intensity transmission function in the form a Hanning window (also known as a Hann window)

For example, a Hanning window may be used as a transmission function, as shown in FIG. 13. The transmission function of FIG. 13 is related to a cosine, and as a function of exposure time may be written in accordance with Equation (12), as follows:

$$m(t) = \frac{1}{2}(1 + \cos(t\pi/T)); \; -T < t < T \quad (12)$$

The Hanning window may be written as a function of displacement x, in accordance with Equation (13), as follows:

$$m'(x) = \frac{1}{2}\left(1 + \cos\left(\pi(s \pm \sqrt{s^2 + 4ax})/2aT\right)\right), \quad (13)$$

in the case of constant acceleration previously described.

Any function which has the desired characteristics of significantly attenuating the light at the start and end of the exposure period, whilst gradually allowing more light to be captured by the sensor 1121 towards the middle of the exposure period, may be used as a transmission function. Such a transmission function allows the image signal reaching the sensor 1121 to gradually fade in, reach a point of maximum image intensity, then fade out towards the end of the exposure period. Apart from the Hanning window shown in FIG. 13, other examples of the transmission function for implementing the image intensity attenuation function include Gauss and Hamming window functions. Other functions may also be used, where the light is not completely attenuated at the beginning and/or the end of the exposure time and which deviate at least to some extent from the symmetrical bell-shaped curve shown in FIG. 13. Examples of attenuated PSF curves are now described with reference to FIGS. 14A and 14B.

Figure 14A:
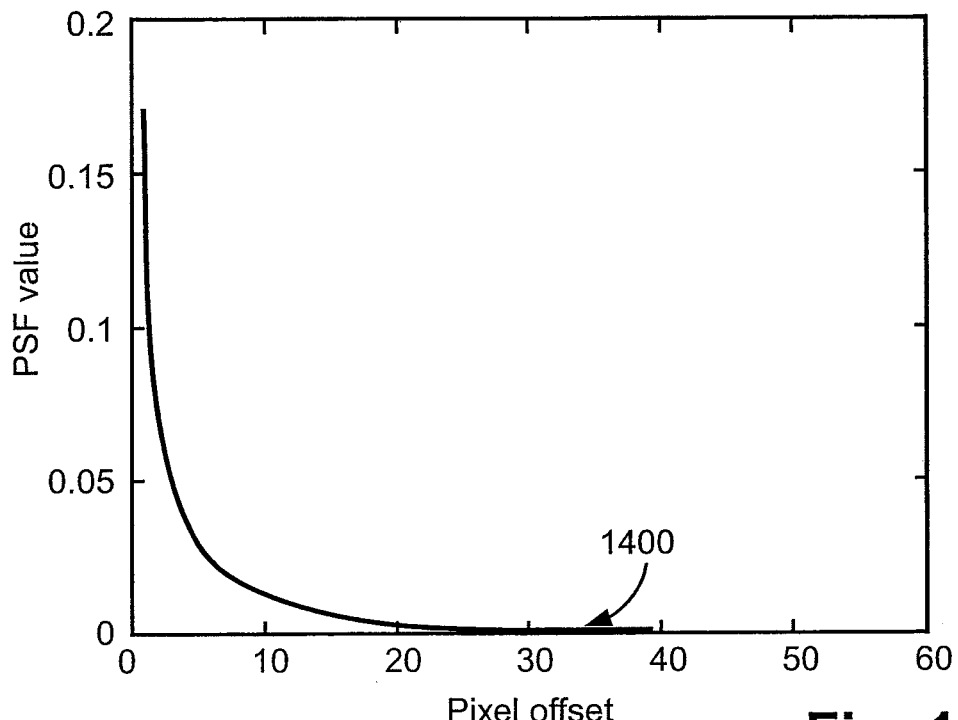
FIG. 14A shows a graph of a point spread function (PSF) for a stationary point source, when the image of the point source is captured according to one of the described methods.

FIG. 14A is a graph of the PSF for a point source moving across the sensor 1121 at a constant rate of acceleration. The parameter values for the initial speed, acceleration value and exposure time are the same as used in FIG. 3A and result in the point source traversing thirty five (35) pixels in one direction followed by thirty five (35) pixels in the opposite direction. During the exposure period, the intensity of the light imaged onto the sensor 1121 is attenuated. The coefficient of light transmission is varied during the exposure period according to the Hanning window function shown in FIG. 13. The effect of the introduced variable attenuation is to remove the discontinuity 300 shown in FIG. 3A. By comparing the PSF curves FIG. 3A and FIG. 14A, it can be seen that there is no longer a discontinuity 1400 at pixel offset thirty five (35).

Figure 14B:
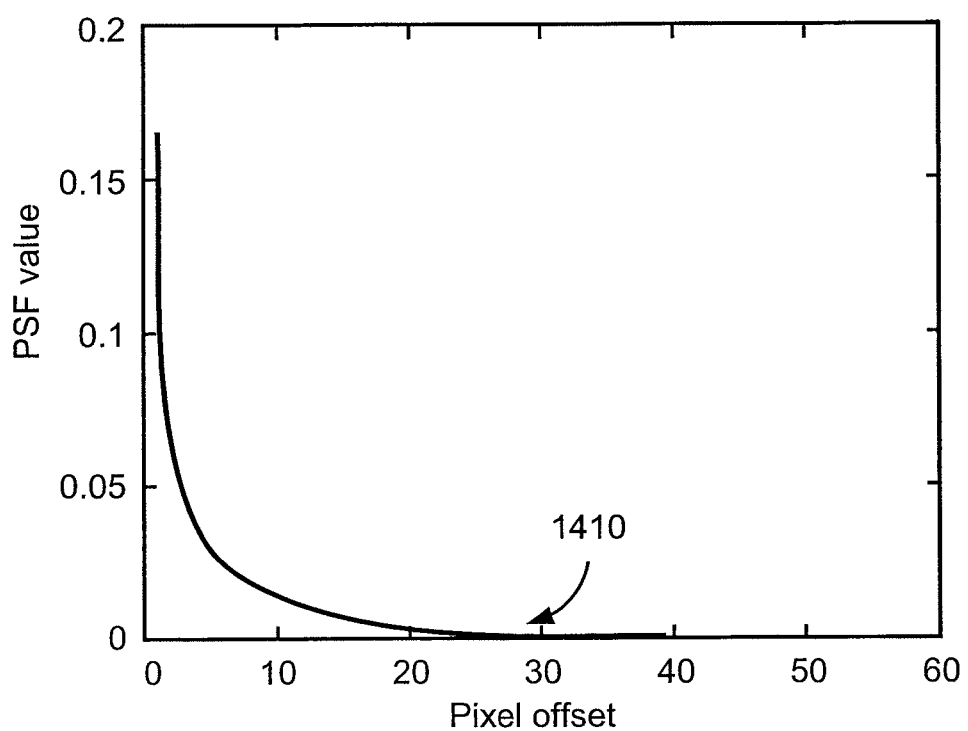
FIG. 14B shows a graph of a point spread function (PSF) for a moving point source, when the image of the point source is captured according to one of the described methods.

FIG. 14B is a graph of the point spread function for a point source moving across the sensor 1121 at a fixed rate of acceleration. The parameter values for the initial speed, acceleration value and exposure time are the same as used in FIG. 3B and result in the point source traversing forty (40) pixels in one direction and thirty (30) pixels in the reverse direction. During the exposure period, the intensity of the light imaged onto the sensor 1121 is again attenuated according to the Hanning window function of FIG. 13. Again, the effect of the attenuation is to remove the discontinuities 301 and 320 shown in FIG. 3B at pixel offset thirty (30) and pixel offset forty (40), respectively.

Restoration methods such as de-convolution using a Wiener filter or the iterative Richardson-Lucy algorithm may be used to de-blur the captured image. The PSF for a stationary object, as shown in FIG. 14A, is used to de-blur the captured image. As the PSF for moving objects is similar to the PSF for a stationary object and neither PSF contains discontinuities, an improved result may be achieved using such de-blurring. The PSF used for de-blur may be calculated on the basis of the exposure time, the acceleration function and the transmission function used during image capture. Thus, such information is made available to the de-blur algorithm.

Figure 15A:
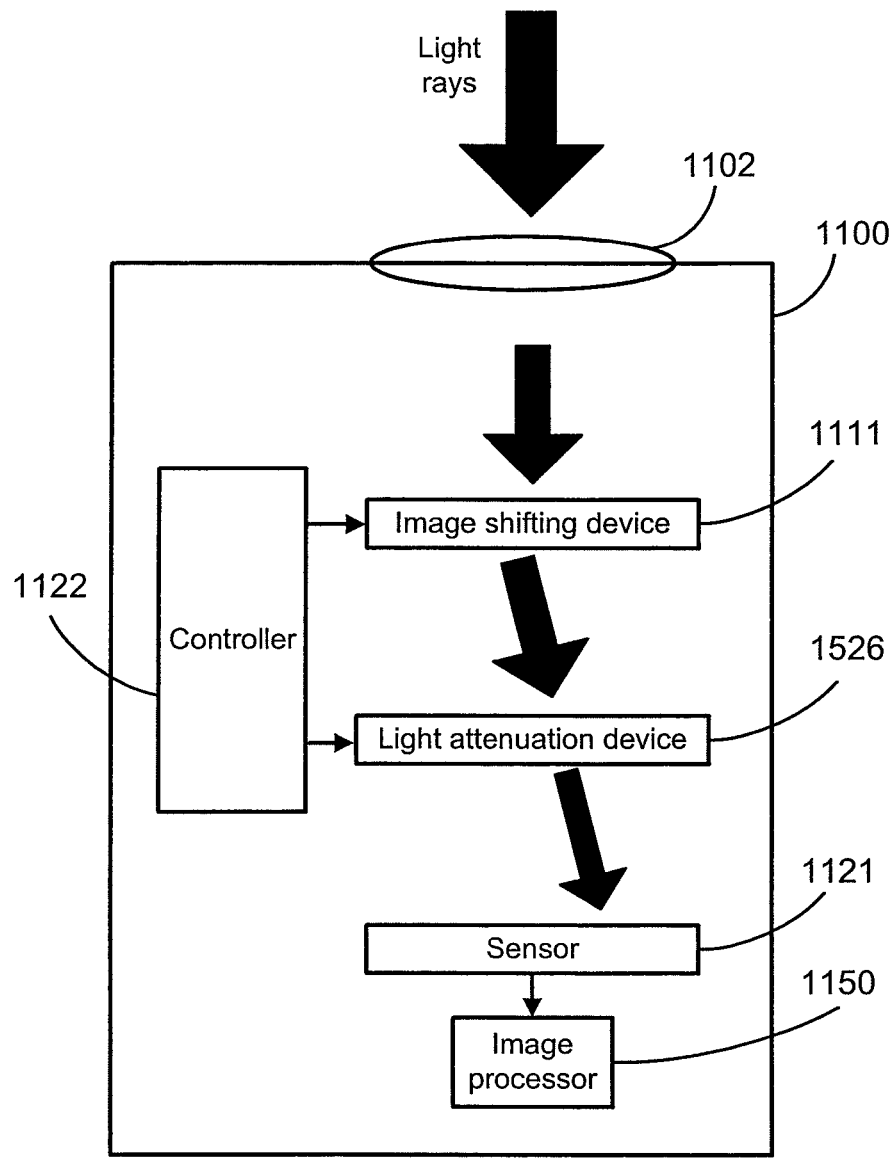
FIG. 15A shows selected elements of the digital camera system of FIG. 11A, upon which one or more of the described methods can be practiced.

FIG. 15A is a block diagram of the digital camera system 1100 of FIG. 11A, which shows only selected elements relevant to performing the methods described below. The remaining components shown in FIG. 11A, as well as any additional components used in the normal camera operation are not included in FIG. 15A for clarity.

Light entering the camera 1100 is focused by the optical system 1102 on the sensor 1121 and subsequently processed by the image processor 1150 to obtain a restored image. The image processor 1150 is usually identical with the main controller 1122 running the standard camera functionality, but may also be a separate dedicated processor. The image processor 1150 need not be contained within the camera 1100 and image restoration may be performed in another device such as a a general purpose computer. Prior to reaching the sensor 1121, light passes through mechanism 1111 (or image shifting device) which causes a variable translation of the image with respect to the sensor 1121. In one embodiment, the mechanism 1111 is a movable lens element normally used for image stabilisation. The mechanism 1111 allows shifting the location of the image on the sensor 1121. Accordingly, the sensor 1121 is stationary and the image is accelerated with respect to the sensor 1121. Image stabilisation may be performed in conjunction with the image shifting operation.

As described above, in one embodiment image shifting may be performed by moving the sensor 1121 and not the image. Moving the image sensor 1121 during exposure may be used for image stabilisation and such a function may be combined with the shifting operation described above. The shifting of the sensor 1121 may be performed by mechanical arrangements that enable the amount of shift to be modified by the controller 1122 (or processor 1150) during the exposure. The light intensity of the shifted image may be attenuated by a light attenuation device 1526. In one implementation, the light attenuation device 1526 is a filter with controllable transmission, such as a polarizing LCD filter. The order of the image shifting operation and attenuation operation indicated in FIG. 15A may be reversed. Also, FIG. 15A shows the mechanism (or image shifting device) 1111 to be located inside the camera 1100. However, the mechanism (or image shifting device) 1111 may also be placed inside the lens assembly, for example in the case of a removable lens.

Figure 15B:
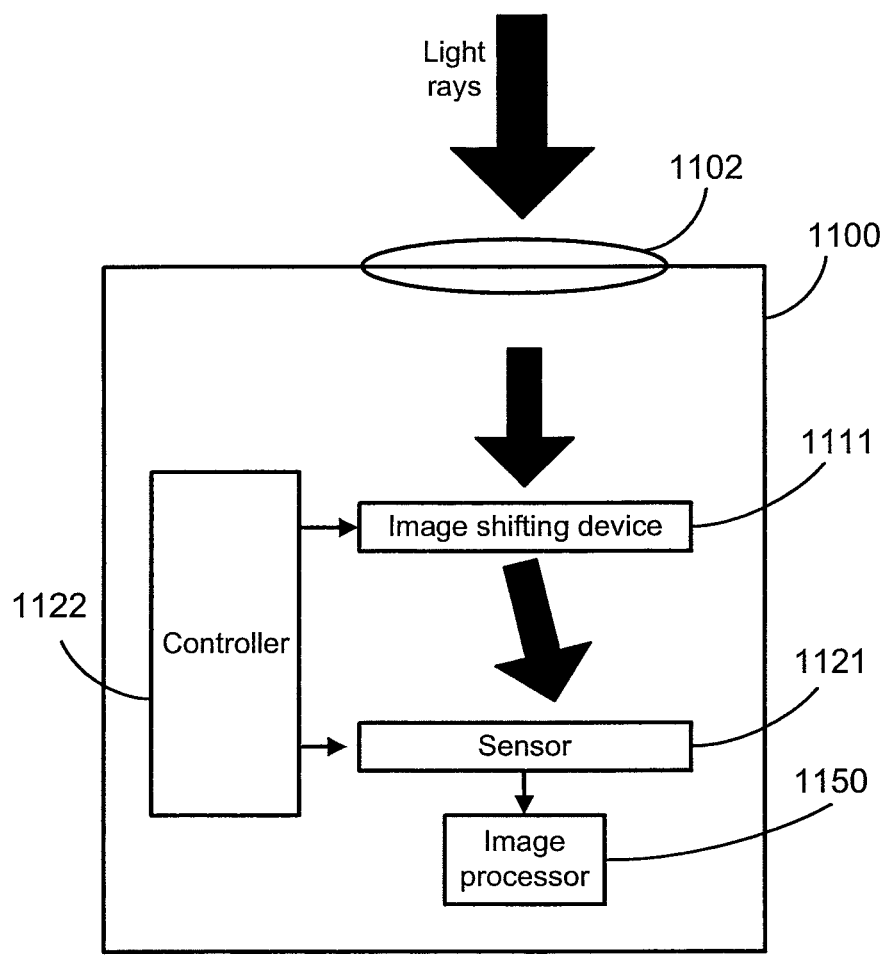
FIG. 15B shows selected elements of the digital camera system of FIG. 11A, upon which one or more of the described methods can be practiced.

FIG. 15B is a schematic block diagram of the digital camera system 1100 of FIG. 11A showing only selected elements relevant to performing an alternative embodiment of the method described below. The described method is not limited to the use of a light intensity attenuation device 1526 (as shown in FIG. 15A) and may involve modulating other parameters associated with the overall image signal transfer from incoming light to detector output signal.

In the embodiment of FIG. 15A, the overall image intensity attenuation function is effected by way of the light intensity attenuation device 1526 with controllable transmission. However, in the embodiment shown in FIG. 15B, the image intensity attenuation function is effected by dynamically altering the pixel transfer function of the sensor 1121. The pixel transfer function may be altered by use of a response characteristic which allows control of the ratio of accumulated charge with light intensity. In one embodiment, the altering of the pixel transfer function may be achieved by use of a pixel element which incorporates a current mirror circuit. In this case, the ratio of accumulated charge in a capacitance and the photocurrent generated by a photodiode during exposure is varied by changing the current mirror bias voltage.

In one embodiment, the image intensity attenuation function may be effected by changing the aperture size during exposure. Light intensity transmission level is updated by the controller 1122 (or processor 1150) during the exposure period. In one embodiment, the pixel values may be repeatedly read-out and the pixel reset over the exposure period. The light intensity values from each pixel may be weighted according to the attenuation function and summed to approximate a temporal attenuation function. However, while the physical means for implementing the attenuation function may vary, the main concepts and features described here are applicable to all described embodiments.

Figure 16:
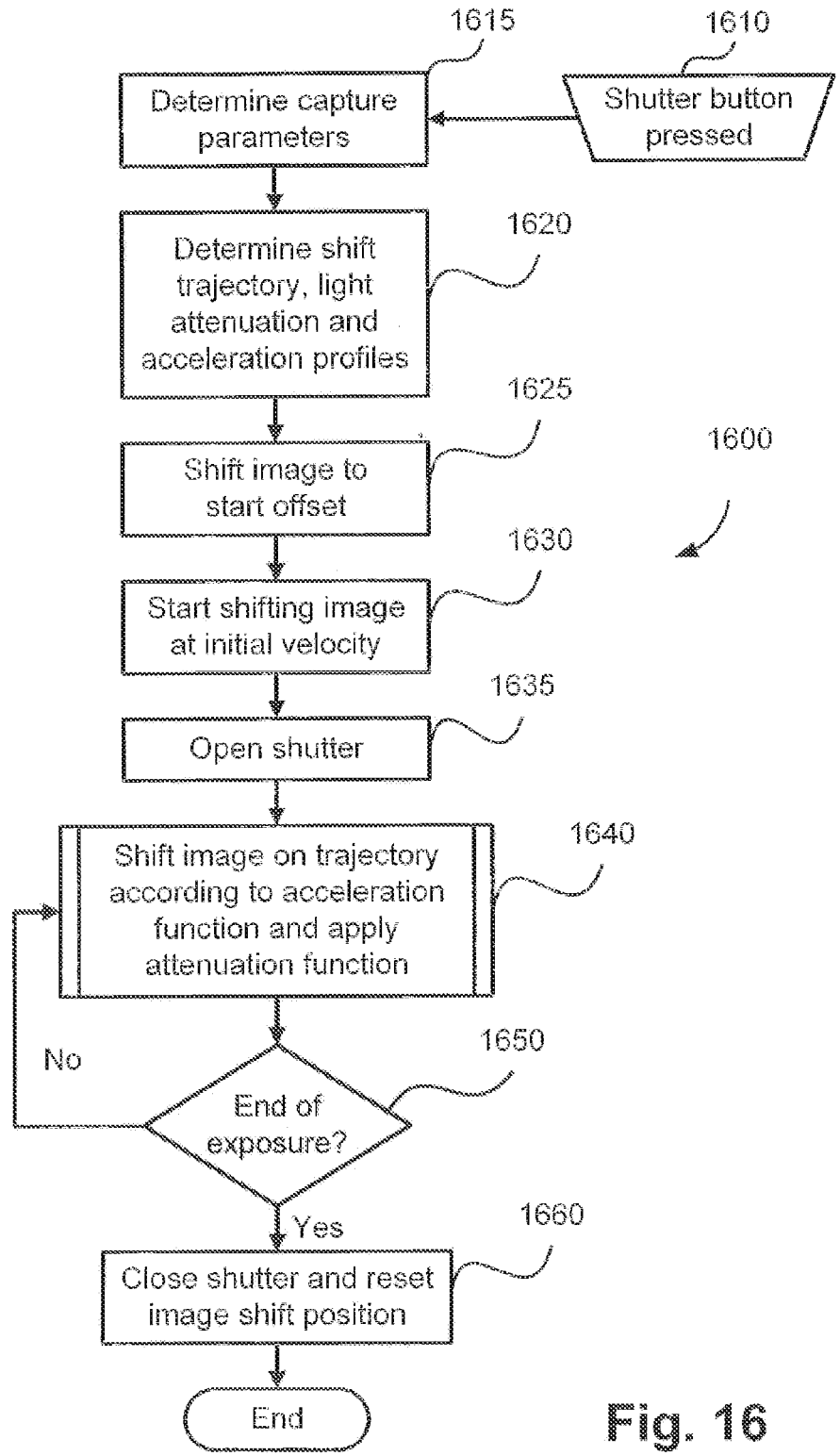
FIG. 16 is a flow diagram showing a method of forming an image.

FIG. 16 is a flow diagram showing a method 1600 of forming an image. The method 1600 uses the image sensor 1521. The method 1600 may be implemented as one or more code modules of the software program resident within the ROM 1160 of the camera 1100 and being controlled in its execution by the processor 1150 (i.e., as part of the controller 1122).

Alternatively, the method 1600 may be implemented as one or more software code modules of the complimentary software product resident on and being executed by a processor of a general purpose computer as described above.

When the user wishes to capture an image (i.e., take a photograph), the shutter button is pressed which causes method 1600 to be invoked (step 1610). The method 1600 extends the usual processing steps involved in capturing image data representing the image. As well as opening and closing the shutter (or shutter mechanism) 1120, the image is shifted across the sensor 1121 whilst the accumulated light intensity is attenuated according to an image intensity attenuation function.

The method 1600 begins at step 1615, where the processor 1150 determines capture parameters. In particular, a required amount of exposure time (i.e., the exposure period) is obtained by the processor 1150 at step 1615. The exposure time may be set by the camera operator (user) or be determined by the processor 1150 as a result of a light metering operation performed prior to commencing the exposure.

At step 1620, the processor 1150 performs the step of providing an image shift trajectory and image shift acceleration function. The processor 1150 also performs the step of providing an image intensity attenuation function that will result in the formed image having a gradual fade in and fade out over the exposure period. As described below, the image intensity attenuation function is applied to the image light intensity reaching the sensor 1121, to modify the image being captured. The image intensity attenuation function may be formed using any one of the Hamming function, the Gauss function or the Hanning function, as described above.

In particular, the trajectory of image shift is determined by the processor 1150 at step 1620. The image shift is along a predetermined type of trajectory. Such a predetermined type of trajectory generally includes a straight horizontal line. The image shift trajectory is arranged to be in a direction substantially parallel with the direction of movement of an object that is being imaged.

In one embodiment, the image moves along the trajectory firstly in one direction, reaches a predetermined point of maximum deviation and then moves in the opposite direction along the same horizontal line of the trajectory, as shown in FIG. 1B. In particular, during the exposure period the image is shifted in one direction along the shift trajectory until the image reaches a predetermined point, and then the image is shifted in the opposite direction, until reaching the initial location of the image at the start of the exposure period. Here the expression "horizontal" may be determined with respect to the orientation of the camera 1100. Alternatively, the expression may indicate an "absolute" horizontal orientation, which remains the same regardless of the orientation of the camera 1100. Other methods of determining the trajectory may also be used. For example, some cameras have the ability to determine the direction of movement of objects within the scene prior to exposure. Thus, the trajectory in this case may be based on the detected dominant direction of an object's motion supplied to, or calculated by, the processor 1150. As described above, in one embodiment, the image shift trajectory may be substantially parallel with the direction of movement of the object.

Displacement and transmission functions that are to be used for the particular capture are also determined by the processor 1150 in step 1620. The displacement and transmission functions may be stored in the RAM 1170. The acceleration function is usually associated with a constant acceleration.

The maximum displacement of the object may be restricted within the image across the sensor 1121. The maximum displacement of the object may be restricted by calculating the appropriate acceleration value based on the exposure period and the maximum possible object speed. The maximum object speed may be estimated by automatically analysing the scene prior to exposure. Alternatively, the maximum object speed may be predetermined. In the case of constant acceleration, the object displacement is given in accordance with Equation (14), as follows:—

$$x_d = aT^2 + s_{max}T + \frac{s_{max}^2}{4a} \qquad (14)$$

The required acceleration may thus be obtained exactly or, since the last term in Equation (14) is small, the acceleration value may be approximated in accordance with Equation (15), as follows:

$$a = \frac{x_d - s_{max}T}{T^2} \quad (15)$$

where T is half the exposure period.

For example, for FIG. 2B, if the exposure time is one (1), the maximum image object speed is ten (10), the maximum allowable displacement is forty (40), and the required acceleration value is one hundred and forty (140).

As described above, the transmission function may be any function that starts with a strong attenuation, allows the image to gradually fade in and reach a point of maximum image intensity, then fade out towards the end of the exposure period. In one embodiment, the exposure time may subdivided in time intervals.

In step 1620, the processor 1150 calculates image shift offset and transmission function values corresponding to each time interval and stores the image shift offset and transmission function values in RAM 1170, in the form of a look-up table. The transmission function values are obtained by the processor 1150 by re-scaling the respective displacement and transmission curves, determined in step 1620, according to the exposure time determined in step 1615. The scaling is such that the curve of the transmission function spans the entire exposure period.

Following step 1620, the processor 1150 performs a number of steps, as described below, for capturing the image translated across the sensor 1121. The image is captured in accordance with the image shift trajectory and the image shift acceleration function within the exposure period, to produce a captured image.

At the next step 1625, the image is shifted to the initial position calculated for the start of exposure. In the case where the displacement is chosen as being zero (0) halfway through the exposure period, the initial displacement may be determined in accordance with Equation (16), as follows:

$$x_0 = aT^2 + s_{max}T \quad (16)$$

by setting −T to half the exposure period.

For example, FIG. 2A shows the initial displacement is thirty (35) pixels. The displacement value is obtained by setting T=−0.5, since the exposure period is one (1), and using the acceleration value of one hundred and forty (140).

The image shift is of relative nature and refers to a relative movement of the image with respect to the sensor 1121. Thus, instead of moving the image and keeping the sensor 1121 at a fixed location, an alternative implementation may keep the image stationary and move only the sensor 1121. Alternatively, the image shift may be implemented by moving both the captured image and the sensor 1121.

At step 1630, the image is shifted by the processor 1150 at the required initial speed (or velocity). When the speed has been reached, the shutter (or shutter mechanism) 1120 is opened at step 1635 to start the exposure.

It is desired to smoothly vary the attenuation and image shift displacement over the exposure period. In one embodiment, such a smooth variation may be achieved by an iterative procedure where the attenuation value and image shift displacement are repeatedly altered by small amounts during exposure.

During step 1640, the processor 1150 (or controller 1122) causes the mechanism (or image shifting device) 1111 to effect the shifting and the light intensity attenuation device (or attenuator) 1526 to effect the attenuation. The shift and attenuation are effected according to the calculated displacement and transmissions functions (profiles) calculated in step 1620 and stored in the RAM 1170. Accordingly, the image is formed based on the captured image being modified by the image intensity attenuation function.

Step 1640 is performed for each iteration associated with a respective time interval of the exposure time. A method 1700 of shifting and attenuating the image, as executed at step 1640, will be described in detail below with reference to FIG. 17.

At the next step 1650, the processor 1150 checks if the exposure time (or exposure period) has expired. If the exposure time has not expired, the method 1600 returns to step 1640 and another iteration is performed for the subsequent time interval. In this instance, step 1640 is repeated with an updated value for the current exposure time offset. Otherwise, the method 1600 is completed and at step 1660 the shutter 1120 is closed and the mechanism (or image shifting device) 1111 and light intensity attenuation device 1526 are reset to initial values.

The use of the mechanism (or image shifting device) 1111, as described above, is such that shift requests are achieved without any significant delay. In the case where delay occurs due to inertia of the mechanism (or image shifting device) 1111, the high speed of image shift at the start and end of exposure may require minor modifications to the processing steps described in FIG. 16. In particular, the start of exposure may be delayed until the required initial velocity of the image shift has been achieved.

Figure 17:
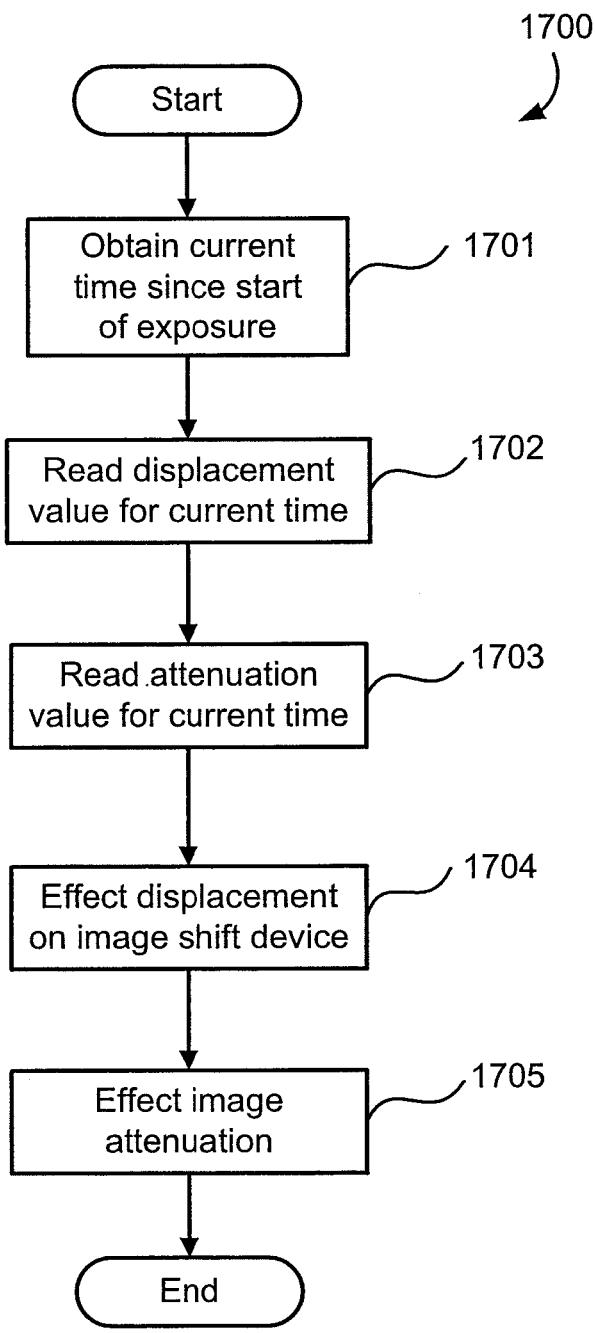
FIG. 17 is a flow diagram showing a method of shifting and attenuating the image, as executed in the method of FIG. 16.

The method 1700 of shifting and attenuating the image, as executed at step 1640, will now be described with reference to FIG. 17. The method 1700 may be implemented as one or more code modules of the software program resident within the ROM 1160 of the camera 1100 and being controlled in its execution by the processor 1150 (i.e., as part of the controller 1122).

Alternatively, the method 1700 may be implemented as one or more software code modules of the complimentary software product resident on and being executed by a processor of a general purpose computer as described above.

The method 1700 begins at step 1701, where the time elapsed since the start of the exposure is obtained by the processor 1150 and stored within the RAM 1170 as a time value. The time value is used by the processor 1150 to, at step 1702, lookup the appropriate image shift displacement function values determined at step 1620.

At the next step 1703, the processor 1150 uses the time value to read the lookup table for the appropriate transmission function value for the particular time value. As described above, the transmission function values are determined at step 820 and are stored in a look-up table within RAM 1170.

At step 1704, the required image shift displacement is effected by the processor 1150 by updating the control signal to the mechanism (or image shifting device) 1111. Then at step 1705, the required image intensity transmission is effected by updating the control signal to the light intensity attenuation control device 1526.

The foregoing describes only some embodiments of the present invention, and modifications and/or changes can be made thereto without departing from the scope and spirit of the invention, the described embodiments being illustrative and not restrictive.

For example, FIG. 2A, FIG. 2B and FIG. 13 represent a substantially continuous control of the transmission and image displacement. The substantially continuous variation by a control signal may be achieved in the above described methods and embodiment of digital camera system 1100, by repeatedly changing the values in small steps. However, an analogue control method may be used instead.

In another alternative embodiment, the light attenuation may be achieved in the described methods using a shutter curtain that has a smoothly graded opacity. In this case, the steps described in FIGS. 16 and 17 may be modified so that the light transmission calculation step 1620 and the control steps 1625, 1630, 1640 and 1650 are not performed. The light intensity attenuation may be performed automatically by the passage of the shutter curtain across the sensor 1121 at the start and end of the exposure period. The speed of the shutter curtain may be varied to achieve modifications to the transmission function.

In addition, the method 1600 described above has been described mainly in the context of a method and a system of forming (or capturing) images. However, the described methods 1600 and 1700 also relate to a computer program product including a computer readable medium having recorded thereon a computer program for effecting the described method for image capture.

The described methods 1600 and 1700 may also be applied to video data. The direction of image shift may be changed for each frame, allowing each frame to be optimally de-blurred.

An alternative conceptual description will now be provided for the above discussed methods 1600, 1700 and the system 1100.

The method 1600 receives and processes a first image to form a second image. The first image comprises light of a scene, such as scene 1101, the image of which is captured by the respective imaging device (i.e., camera 1100). The light is processed by the method 1600 and, as a result, the second image is formed. As far as the method 1600 is concerned, the second image is in the form of electric charges associated with an output generated by the sensor 1121 upon detecting the incoming light of the first image. The second image may be stored in a memory (e.g., 1170 or 1192), visualised by printing, displaying on the display 1123 or on a monitor external to the camera 1100.

The methods 1600 and 1700 require the provision of an image shift trajectory and an image shift acceleration function. During an exposure time or period, the shutter 1120 is open and the light of the scene that is captured by the camera 1100, is translated across the sensor 1121 in accordance with the image shift trajectory and the image shift acceleration function.

The second image is formed by modifying the captured image using an image intensity attenuation function that is also provided. As described above, the image intensity attenuation function is associated with a modulation that results in the second image, formed by way of the sensor 1121 capturing the incoming first image, having a gradual fade in and fade out over the exposure period. The use of the expression "over" in this last sentence is intended to be understood in a broader sense than the expression "during".

In some embodiments the modulation effected on the basis of the attenuation function is applied during the exposure period, i.e. in real time while the shutter 1120 is open. Such embodiments have already been described above and may, for example, involve applying the image intensity attenuation function directly to the incoming image light. Applying the image intensity attenuation function directly to the incoming image light modifies the light intensity reaching the sensor 1121 and, therefore, the captured image. In one such embodiment, the image intensity attenuation function is applied to adjustable aperture 1114 or a shutter mechanism 1120 for restricting the passage of light entering the optical system. Alternatively, the response of a filter (e.g., in the form of the light intensity attenuation device 1526) may be adjusted to attenuate the incoming light according to the image intensity attenuation function, during the exposure time (or exposure period). In addition, the image intensity attenuation function may be applied to modify the sensitivity of the sensor 1121, thus modulating the captured image. The modulation is again effected during the exposure time.

However, in other embodiments, the modulation may be effected not only during, but also after the time of exposure. As described above, one such embodiment may include capturing a plurality of images of the photographed scene by the sensor 1121 during the exposure period. The plurality of images may be combined, either during or after the time of exposure, into a single image. The contribution of each of the plurality of images to the combined image in this case is modified according to the image intensity attenuation function. However, since by its very nature the image intensity attenuation function is a temporal function defined with respect to the exposure period, even in such an embodiment, the modulation function application is still associated with the exposure period. Hence the use of the expression "over", when discussing the modulation effected by the image intensity attenuation function indicates that the formed image has a gradual fade in and fade out over the exposure period, even though such may not have been effected in a real-time manner during the exposure period.

The method 1600 may further comprise an additional step executed before the application of the image intensity attenuation function. The additional step comprises subdividing the exposure time (or exposure period) into time intervals and calculating image shift offset values and attenuation function values corresponding to each time interval. The calculation of the values is based on the determined exposure time (or exposure period), the determined image shift acceleration function and the determined image transmission function.

In one embodiment, as described above, the sensor 1121 is stationary and the incoming image is accelerated with respect to the sensor 1121. The image shift trajectory may be arranged to be in a direction substantially parallel with the direction of movement of the object that is imaged. With such an arrangement, during the exposure time, the image may be shifted firstly in one direction along the shift trajectory across sensor 1121. Once the image reaches a predetermined point, the image may then be shifted in the opposite direction, until reaching the initial location of image at the start of the exposure time. In one implementation, the predetermined point is reached by the image at the mid point of the exposure time.

The image shift acceleration function may comprise a constant acceleration. The image intensity attenuation function, providing the fade-in and fade-out of the image, may comprise any one of the following functions; Hamming function, the Gauss function or the Hanning function.

In yet another alternative embodiment, the method 1600 may also be described as being a method of forming an image captured by the sensor 1121. The method of such an alternative embodiment starts with the step of providing a trajectory and an acceleration function. In particular, the provided image intensity attenuation function is intended to be applied to elements of the imaging system so as to effect a gradual fade in and fade out of the formed image over an exposure period. The acceleration function may be used to accelerate the image formed by light of the photographed scene, which has entered the capturing device (or camera 1100). The image is accelerated across the sensor 1121, along the provided trajectory, and according to the acceleration function. This is followed by the step of capturing the image, which is being accelerated across the sensor 1121 according to the acceleration function, using the image intensity attenuation function.

The above described method 1600 of forming an image using an image sensor 1121 can be performed on an image forming system. The imaging system comprises a sensor (1121), image shifting means (1111), image attenuation means (or light intensity attenuation device) 1526 and one or more processors (1150). The sensor (1121) is used for capturing the incoming image. The image shifting means 1111 is used for shifting the image that has entered the image forming system, with respect to the sensor and along an image shift trajectory. The image attenuation means 1526 modulates the image captured by the sensor. As was described in relation to the method 1600, the modulation may be effected during or after the exposure time.

The one or more processors 1150 are used for determining each of the image shift trajectory, the image shift acceleration function and the image intensity attenuation function. The functions are either computed by the processors or retrieved from memory (e.g., RAM 1170). The one or more processors 1150 are also used for controlling the image shifting means (1111) so as to, during the exposure time, capture the image by exposing the sensor to the image while shifting the image relative to the sensor. The relative shift of the image is effected along the image shift trajectory and according to the image shift acceleration function. The one or more processors also control the image attenuation means 1526 so as to effect the modulation of the image captured by the sensor according to the image intensity attenuation function. Thus, the final image output by the image forming system is modulated according to the image intensity attenuation function.

The shifting means may comprise an arrangement (i.e., the mechanism 1111) for moving the movable lens 1112. Embodiments of the image attenuation means may comprise a variable aperture 1114, shutter 1120 or a filter (i.e., light intensity attenuation device 1526) with controllable transmission. Either of these devices may be used for attenuating the image light intensity reaching the sensor 1121 according to the image intensity attenuation function. Filter (or light intensity attenuation device) 1526 may be a polarizing LCD filter. Another embodiment of the attenuation device (or means) may comprise the sensor 1121 with controllable sensitivity. The sensitivity of the sensor may be modified, during the exposure period, according to the image intensity attenuation function.

The described method may be implemented by means of a computer program which is executable by a computer module to make the computer module form an image of an object by capturing it on a sensor. Such a program comprises code for determining each of (i) an amount of exposure time for exposing the sensor to the image, (ii) an image shift trajectory, (iii) an image shift acceleration function and (iv) an image intensity attenuation function. The program may also include code for capturing the image while, during the exposure time, shifting the image relative to the sensor the relative shift of the image being effected along the image shift trajectory and according to the image shift acceleration function. Finally, the program may also comprises code for modifying the captured image according to the image intensity attenuation function to form the image.

A computer readable storage medium may be used to carry such a computer program recorded thereon.

The above methods described the processing of two dimensional (2D) image data as repeated processing of one dimensional (1D) lines of pixels in the direction of motion. The methods may be configured to perform ghost matching over two dimensional (2D) regions, allowing improved noise performance and use of processor resources.

One of the advantages of the above described methods is that only one image needs to be captured. The described methods provide an improved quality de-blurred image as well as moving object information.

In the context of this specification, the word "comprising" means "including principally but not necessarily solely" or "having" or "including", and not "consisting only of". Variations of the word "comprising", such as "comprise" and "comprises" have correspondingly varied meanings.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The claims defining the invention are as follows:

1. A method of forming an image using an image sensor, the method comprising the steps of:
   providing an image shift trajectory and image shift acceleration function;
   providing an image intensity attenuation function that indicates light intensity transmission to the image sensor, the image intensity attenuation function attenuating light at start of an exposure period allowing the light to fade in and allowing the light to fade out towards an end of the exposure period;
   capturing an image translated across the sensor in accordance with the image shift trajectory and the image shift acceleration function within the exposure period to produce a captured image; and
   forming the image based on the captured image being modified by the intensity attenuation function.

2. The method of claim 1, wherein the intensity attenuation function is applied to the image light intensity reaching the sensor, to modify the captured image.

3. The method of claim 1, wherein the intensity attenuation function is applied to the sensitivity of the sensor, to modify the captured image.

4. The method of claim 1, wherein a plurality of images are captured by the sensor during the exposure period, the plurality of images being combined into a single image, the contribution of each of the plurality of images to the combined image being modified according to the intensity attenuation function.

5. The method of claim 1, wherein the image shift trajectory is in a direction substantially parallel with a direction of movement of an imaged object.

6. The method of claim 1, wherein during the exposure period the image is shifted in one direction along the shift trajectory until the image reaches a predetermined point, and then shifted in the opposite direction, until reaching the initial location of the image at the start of the exposure period.

7. The method of claim 1, wherein the intensity attenuation function comprises any one of the Hamming function, the Gauss function or the Hanning function.

8. The method of claim 1, wherein the sensor is stationary and the image is accelerated with respect to the sensor.

9. An image forming system comprising;
a sensor for capturing the image;
shifting means for shifting the image with respect to the sensor along an image shift trajectory;
image attenuation means for modulating the image captured by the sensor; and
one or more processors for:
determining each of (i) the image shift trajectory, (ii) an image shift acceleration function and (iii) an image attenuation function;
controlling the shifting means so as to, during an exposure period, capture the image by exposing the sensor to the image while shifting the image relative to the sensor, the relative shift of the image being effected along the image shift trajectory and according to the image shift acceleration function; and
controlling the image attenuation means so as to form the image by modulating the image captured by the sensor according to the image attenuation function;
wherein the image attenuation means comprises a filter with controllable transmission for attenuating the image light intensity reaching the sensor according to the attenuation function.

10. The image forming system of claim 9, wherein the shifting means comprises a movable lens.

11. A non-transitory computer readable storage medium having a computer program recorded thereon, the program being executable by a computer module to make the computer module form an image of an object by capturing it on a sensor, the program comprising:
code for determining each of (i) an image shift trajectory, (ii) an image shift acceleration function and (iii) an image attenuation function;
code for capturing the image while, during an exposure period, shifting the image relative to the sensor the relative shift of the image being effected along the image shift trajectory and according to the image shift acceleration function, and
code for modifying the captured image according to the image attenuation function to form the image, the image attenuation function indicating light intensity transmission to the sensor, wherein the image intensity attenuation function attenuates light at start of the exposure period allowing the light to fade in and allowing the light fade out towards an end of the exposure period.

* * * * *